(12) United States Patent
Zhang et al.

(10) Patent No.: US 12,282,641 B2
(45) Date of Patent: Apr. 22, 2025

(54) DISPLAY SUBSTRATE AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Shun Zhang, Beijing (CN); Yuanqi Zhang, Beijing (CN); Fan He, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/291,903

(22) PCT Filed: Jul. 27, 2022

(86) PCT No.: PCT/CN2022/108254
§ 371 (c)(1),
(2) Date: Jan. 24, 2024

(87) PCT Pub. No.: WO2023/011284
PCT Pub. Date: Feb. 9, 2023

(65) Prior Publication Data
US 2024/0361874 A1 Oct. 31, 2024

(30) Foreign Application Priority Data
Aug. 3, 2021 (CN) .......................... 202110888129.0

(51) Int. Cl.
*G06F 3/047* (2006.01)
*G06F 3/041* (2006.01)
*G06F 3/044* (2006.01)

(52) U.S. Cl.
CPC .......... *G06F 3/047* (2013.01); *G06F 3/04164* (2019.05); *G06F 3/0443* (2019.05); *G06F 3/0446* (2019.05); *G06F 2203/04102* (2013.01)

(58) Field of Classification Search
CPC .... G06F 3/047; G06F 3/04164; G06F 3/0443; G06F 3/0446; G06F 2203/04102;
(Continued)

(56) References Cited

U.S. PATENT DOCUMENTS

| 2012/0092273 | A1 | 4/2012 | Lyon et al. | |
| 2014/0116863 | A1* | 5/2014 | Lee .......................... | G06F 3/041 427/535 |

(Continued)

FOREIGN PATENT DOCUMENTS

| CN | 107783698 A | 3/2018 |
| CN | 109445646 A | 3/2019 |

(Continued)

OTHER PUBLICATIONS

PCT/CN2022/108254 international search report dated Oct. 10, 2022.

*Primary Examiner* — Amy Onyekaba
(74) *Attorney, Agent, or Firm* — IPro, PPLC

(57) ABSTRACT

Provided in the embodiments of the present disclosure are a display substrate and a display apparatus. The display substrate includes a base substrate, including: a display area, a bending area, which is connected to a side of the display area, and an extension area, which is connected to the side of the bending area that is away from the display area; a touch-control wiring group, wherein the touch-control wiring group is located in the extension area, and the touch-control wiring group includes a plurality of touch-control (Continued)

wirings, which extend in a first direction and are sequentially arranged in a second direction; and a first floating wiring group.

20 Claims, 26 Drawing Sheets

(58) Field of Classification Search
CPC . G06F 2203/04103; G06F 2203/04112; G06F 3/0448; G06F 3/0445
See application file for complete search history.

(56) References Cited

U.S. PATENT DOCUMENTS

| | | | |
|---|---|---|---|
| 2014/0176825 A1* | 6/2014 | Lee | G06F 3/0412 349/12 |
| 2016/0018348 A1* | 1/2016 | Yau | G06F 3/0443 324/697 |
| 2016/0293631 A1 | 10/2016 | Sun et al. | |
| 2019/0212855 A1* | 7/2019 | Shang | H01L 27/124 |
| 2020/0357867 A1* | 11/2020 | Song | H01L 27/124 |
| 2021/0118958 A1* | 4/2021 | Park | H10K 59/805 |
| 2022/0206606 A1* | 6/2022 | Ye | G06F 3/0443 |

FOREIGN PATENT DOCUMENTS

| | | | |
|---|---|---|---|
| CN | 212515770 U | * | 2/2021 |
| CN | 112864199 A | | 5/2021 |
| CN | 113552970 A | | 10/2021 |

* cited by examiner g1 g2 g3 g4

DISPLAY SUBSTRATE AND DISPLAY APPARATUS

CROSS-REFERENCE TO RELATED APPLICATIONS

The application is a US National Stage of International Application No. PCT/CN2022/108254, filed on Jul. 27, 2022, which claims the priority of the Chinese patent application No. 202110888129.0, filed with the China National Intellectual Property Administration on Aug. 3, 2021 and named "DISPLAY SUBSTRATE AND DISPLAY APPARATUS", the entire contents of which are incorporated herein by reference.

TECHNICAL FIELD

The present application relates to the field of semiconductor technology, and in particular to a display substrate and a display apparatus.

BACKGROUND

With the development of the active-matrix organic light-emitting diode (AMOLED) towards thinner and lighter, the on cell technology will gradually replace the existing touch screen pane (TSP) out-cell method. The on cell technology is the integrated technology of the touch display screen, which uses the photolithography process to form electrodes and wires of the touch screen on the packaging layer.

SUMMARY

An embodiment of the present disclosure provides a display substrate, including:
  a base substrate; where the base substrate includes: a display area, a bending area connected to a side of the display area, and an extension area connected to a side of the bending area away from the display area;
  a touch wiring group arranged in the extension area; where the touch wiring group includes a plurality of touch wires extending along a first direction and arranged in sequence along a second direction; and
  at least one first floating wiring group on at least one side of the touch wiring group; where the at least one first floating wiring group includes at least one first floating wire extending along the first direction;
  where the first direction is a direction pointing from the display area to the bending area and the extension area, and the at least one first floating wire is electrically insulated from the touch wires.

In a possible implementation, the first floating wiring groups are arranged at two sides of the touch wiring group, and different first floating wiring groups have the same number of first floating wires.

In a possible implementation, the display substrate includes a first power supply line in the extension area; and an orthographic projection of the first floating wire on the base substrate is at least partially within an orthographic projection of the first power supply line on the base substrate.

In a possible implementation, each of the first floating wires includes a first sub-floating wire and a second sub-floating wire which are stacked; and an orthographic projection of the first sub-floating wire on the base substrate is at least partially coincident with an orthographic projection of the second sub-floating wire on the base substrate.

In a possible implementation, each of the touch wires includes a first sub-touch wire and a second sub-touch wire which are stacked; and the first sub-floating wire and the first sub-touch wire are on the same layer and have the same material, and the second sub-floating wire and the second sub-touch wire are on the same layer and have the same material.

In a possible implementation, the bending area includes a first edge close to the display area, a second edge opposite to the first edge and close to the extension area, and a connection edge that connects the first edge with the second edge;
  where the display substrate includes signal traveling lines in the bending area, and a region between the signal traveling lines and the connection edge has a second floating wiring group surrounding the connection edge; and the second floating wiring group includes at least one second floating wire, and the second floating wire is electrically insulated from the signal traveling lines.

In a possible implementation, the second floating wire includes a third sub-floating wire and a fourth sub-floating wire which are stacked; and an orthographic projection of the third sub-floating wire on the base substrate is at least partially coincident with an orthographic projection of the fourth sub-floating wire on the base substrate.

In a possible implementation, the display substrate further includes a third floating wiring group on a side of the second floating wiring group away from the connection edge; and the third floating wiring group includes at least one third floating wire extending along the second direction.

In a possible implementation, the third floating wire includes a fifth sub-floating wire and a sixth sub-floating wire which are stacked; and an orthographic projection of the fifth sub-floating wire on the base substrate is at least partially coincident with an orthographic projection of the sixth sub-floating wire on the base substrate.

In a possible implementation, in a direction perpendicular to the second edge, a minimum distance between the third floating wiring group and the signal traveling lines is smaller than a distance between the third floating wiring group and the second edge.

In a possible implementation, the display area includes a touch area having touch electrodes, and a lead area surrounding the touch area and having touch leads; and the lead area includes a first compensation capacitor electrically connected to the touch leads at at least one corner position.

In a possible implementation, the touch electrodes include a plurality of first touch electrodes extending along the first direction, and a plurality of second touch electrodes extending along the second direction and electrically insulated from the first touch electrodes; the touch leads include first touch leads that are electrically connected to the first touch electrodes in one-to-one correspondence, and second touch leads that are electrically connected to the second touch electrodes in one-to-one correspondence; the first touch leads and the second touch leads each has double-layer sub-leads; and at a corner position having the first touch lead and the second touch lead, the display substrate includes the first compensation capacitor formed by mutual extension of different layers of sub-leads of the first touch lead and the second touch lead.

In a possible implementation, each of the first touch leads includes a first sub-touch lead and a second sub-touch lead which are stacked, and each of the second touch leads includes a third sub-touch lead and a fourth sub-touch lead which are stacked; and the first sub-touch lead and the third sub-touch lead are on the same layer and have the same material, and the second sub-touch lead and the fourth sub-touch lead are on the same layer and have the same material;

at the corner position having the first touch lead and the second touch lead, the first touch lead closest to the touch area has a first lead extension part extending from the first sub-touch lead, the second touch lead closest to the touch area has a fourth lead extension part extending along the fourth sub-touch lead, and an orthographic projection of the first lead extension part on the base substrate overlaps with an orthographic projection of the fourth lead extension part on the base substrate, to form the first compensation capacitor; or, at the corner position having the first touch lead and the second touch lead, the first touch lead closest to the touch area has a second lead extension part extending from the second sub-touch lead, the second touch lead closest to the touch area has a third lead extension part extending along the third sub-touch lead, and an orthographic projection the second lead extension part on the base substrate overlaps with an orthographic projection of the third lead extension part on the base substrate, to form the first compensation capacitor.

In a possible implementation, at a corner position having only the second touch lead, the display substrate in the lead area further includes a first touch electrode extension part extending from the first touch electrode closest to the touch area; and the display substrate includes the first compensation capacitor formed by the first touch electrode extension part and the second touch lead.

In a possible implementation, the first touch electrode extension part is on a same layer as the fourth sub-touch lead; and at a corner position having only the second touch lead, an orthographic projection of the first touch electrode extension part on the base substrate is partially overlapped with an orthographic projection of the third sub-touch lead on the base substrate to form the first compensation capacitor.

In a possible implementation, at a corner position having only the first touch lead, the display substrate in the lead area further includes a second touch electrode extension part extending from the second touch electrode closest to the touch area; and the display substrate includes the first compensation capacitor formed by the second touch electrode extension part and the first touch lead.

In a possible implementation, the second touch electrode extension part is on a same layer as the second sub-touch lead; and at the corner position having only the first touch lead, an orthographic projection of the second touch electrode extension part on the base substrate is partially overlapped with an orthographic projection of the first sub-touch lead on the base substrate to form the first compensation capacitor.

In a possible implementation, the display substrate further includes a through hole in the display area; where the display substrate includes: a first compensation part at a side of the first touch electrode facing the through hole, where the first compensation part is connected to the first touch electrode and surrounds the through hole, and a second compensation part at a side of the second touch electrode facing the through hole, where the second compensation part is connected to the second touch electrode and surrounds the through hole; where the first compensation part and the second compensation part are insulated from each other; and the display substrate includes a second compensation capacitance formed by the first compensation part and the second compensation part at a position of the through hole.

In a possible implementation, the display substrate includes a first epitaxial part located on a different layer from the first compensation part and connected to an end perforation of the first compensation part; and an orthographic projection of the first epitaxial part on the base substrate and an orthographic projection of the second compensation part on the base substrate have an overlapping area, to form the second compensation capacitor.

An embodiment of the present disclosure further provides a display apparatus, which includes the display substrate according to the embodiments of the present disclosure.

DETAILED DESCRIPTION

In order to make the purpose, technical solutions and advantages of the embodiments of the present disclosure more clear, the technical solutions of the embodiments of the present disclosure will be clearly and completely described below in conjunction with the drawings of the embodiments of the present disclosure. Obviously, the described embodiments are some, but not all, of the embodiments of the present disclosure. Based on the described embodiments of the present disclosure, all other embodiments obtained by those of ordinary skill in the art without creative efforts fall within the scope of protection of the present disclosure.

Unless otherwise defined, technical or scientific terms used in the present disclosure shall have their ordinary meaning understood by a person of ordinary skill in the art to which this disclosure belongs. "First", "Second" and similar words used in this disclosure do not indicate any order, quantity or importance, but are only used to distinguish different components. Words such as "include" or "comprise" mean that the elements or things appearing before the word include the elements or things listed after the word and their equivalents, without excluding other elements or things. Words such as "connected" or "connect" are not limited to physical or mechanical connection, but may include electrical connection, whether direct or indirect. "Up", "down", "left", "right", etc., are only used to express relative positional relationships. When the absolute position of the described object changes, the relative positional relationship may also change accordingly.

To keep the following description of the embodiments of the present disclosure clear and concise, the detailed description of known functions and known components is omitted from the present disclosure.

At present, the on cell technology mainly includes a flexible multi-layer on cell (FMLOC) technology and a flexible single-layer on cell (FSLOC) technology. The FMLOC technology is based on the working principle of mutual capacitance detection, and generally adopts two layers of metal to form the transmitter (TX) and receiver (RX) electrodes; and the IC detects the mutual capacitance between TX and RX to realize the touch action. The FSLOC technology is based on the working principle of self-capacitance (or voltage) detection, and generally adopts a single layer of metal to form the electrode; and the IC detects the self-capacitance (or voltage) of the electrode to realize the touch action.

However, in the current FMLOC structure, the problem of non-uniform touch wires below the bending area causes the problem of the final touch performance.

Figure 1A:
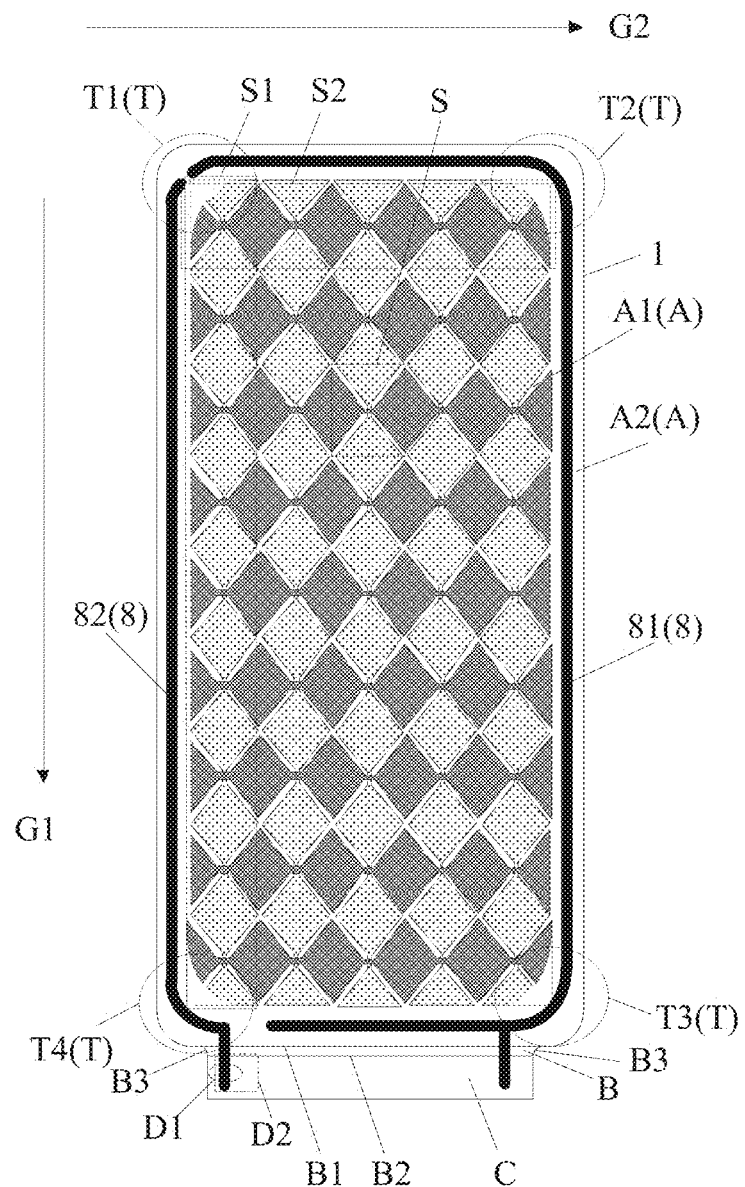
FIG. 1A is a first schematic top view of a display substrate according to embodiments of the present disclosure.
Figure 2A:
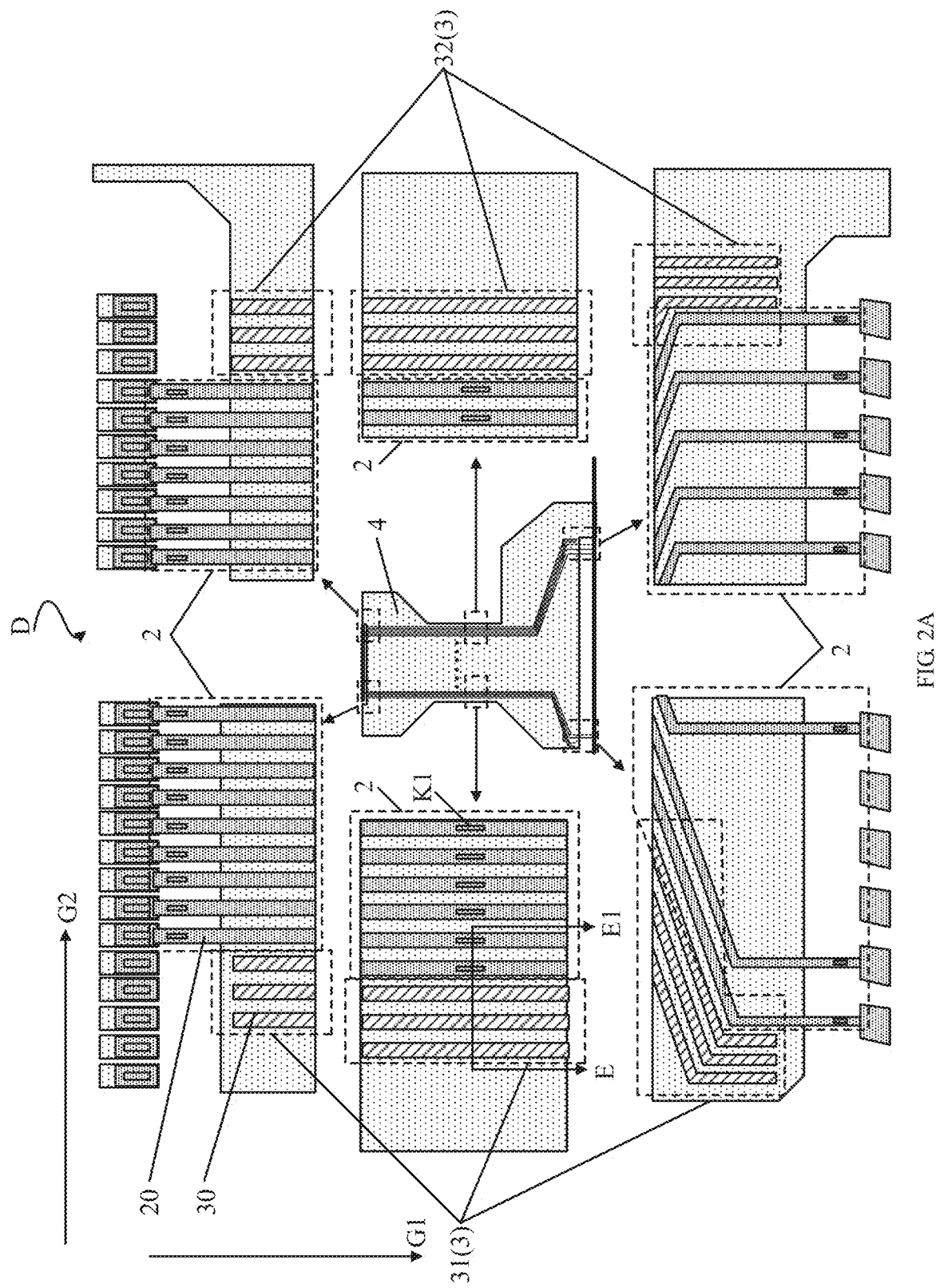
FIG. 2A is an enlarged schematic diagram of a dotted circle D1 in FIG. 1A.

In view of this, referring to FIG. 1A and FIG. 2A, FIG. 2A is a schematic diagram of the enlarged structure of the dotted circle D1 in FIG. 1A, and the outer drawings in FIG. 2A are enlarged schematic diagrams of the middle drawing at different dotted box positions. An embodiment of the disclosure provides a display substrate, including:

a base substrate 1; where the base substrate 1 includes: a display area A, a bending area B connected to a side of the display area A, and an extension area C connected to a side of the bending area B away from the display area A;

a touch wiring group 2; where the touch wiring group 2 is located in the extension area C, and the touch wiring group 2 includes a plurality of touch wires 20 extending along a first direction G1 and arranged along a second direction G2; and at least one first floating wiring group 3; where the first floating wiring group 3 is located on at least one side of the touch wiring group 2, and includes at least one first floating wire 30 extending along the first direction G1; the first direction G1 is a direction pointing from the display area A to the bending area B and the extension area C; and at least one first floating wire 30 is electrically insulated from the touch wires 20.

In the embodiments of the present disclosure, the first floating wiring group 3 is located on at least one side of the touch wiring group 2, and the first floating wiring group 3 includes at least one first floating wire 30. In this way, a plurality of first floating wires 30 are arranged in the periphery of the touch wiring group 2, which can avoid the following problem: if the first floating wiring group 3 is not provided, when patterning to form the touch wires 20, a large amount of etching solutions accumulate in the periphery, which is likely to cause over-etching of the touch wires 20 in the periphery, resulting in uneven line widths of the touch wires 20 in the periphery and the touch wires 20 in the interior, to affect the touch performance. In the embodiments of the present disclosure, a plurality of first floating wires 30 are arranged in the periphery of the touch wires 20; and when there is a large amount of etching solutions in the periphery, the first floating wires 30 in the periphery can be over-etched, thereby protecting the touch wires 20 in the interior, and improving the problem of uniform line widths of touch wires 20 and affecting the touch performance.

Specifically, as shown in the upper or lower side of FIG. 2A, the touch wires 20 can be electrically connected to other signal lines or components (for example, IC) in the extending direction of the touch wires 20, to provide electrical signals for the touch wires 20; and the first floating wires 30 of the first floating wiring group 3 may not be electrically connected to other signal lines in the extending direction of the first floating wires 30, but only serve as protective wires during the etching process.

In a possible implementation, as shown in FIG. 2A, the first floating wiring groups 3 are arranged at two sides of the touch wiring group 2, and different first floating wiring groups 3 have the same number of first floating wires 30. Specifically, for example, in FIG. 2A, the left side of the touch wiring group 2 is provided with a left first floating wiring group 31, and the right side of the touch wiring group 2 is provided with a right first floating wiring group 32. In this way, the touch wires 20 on both edge sides of the touch wiring group 2 can be protected.

In a possible implementation, as shown in the enlarged schematic view on the upper side of FIG. 2A, the display substrate includes a first power supply line 4 located in the extension area C; and an orthographic projection of the first floating wires 30 on the base substrate 1 is at least partially within an orthographic projection of the first power supply line 4 on the base substrate 1. Specifically, the orthographic projection of the first floating wires 30 on the base substrate 1 may be partly located within the orthographic projection of the first power supply line 4 on the base substrate 1, and partly not located within the orthographic projection the first power supply line 4 on the base substrate 1. The orthographic projection of the first floating wires 30 on the base substrate 1 may also be all located within the orthographic projection of the first power supply line 4 on the base substrate 1, that is, in combination with the enlarged schematic diagram on the upper side of FIG. 2A, in the extension area C, an extension length of the orthographic projection of the first floating wires 30 on the base substrate 1 along the first direction G1 is smaller than a length of the orthographic projection of the first power supply line 4 on the base substrate 1 along the first direction G1. The extension length of the orthographic projection of the touch wires 20 on the base substrate 1 along the first direction G1 may be greater than the length of the orthographic projection of the first power supply line 4 on the base substrate 1 along the first direction G1, to be electrically connected with other signal lines.

Specifically, the first power supply line 4 may be a VSS signal line. Specifically, below the bending area B (that is, the extension area C), in the direction perpendicular to the base substrate 1, the first floating wires 30 and the touch wires 20 can be located at a side of the VSS signal line away from the base substrate 1. The constant voltage signal of the VSS signal line can be used to shield the display signals of other signal lines of the display substrate, preventing the touch signal from interacting with the backplane display signals (GOA signal and Data signal).

Figure 1B:
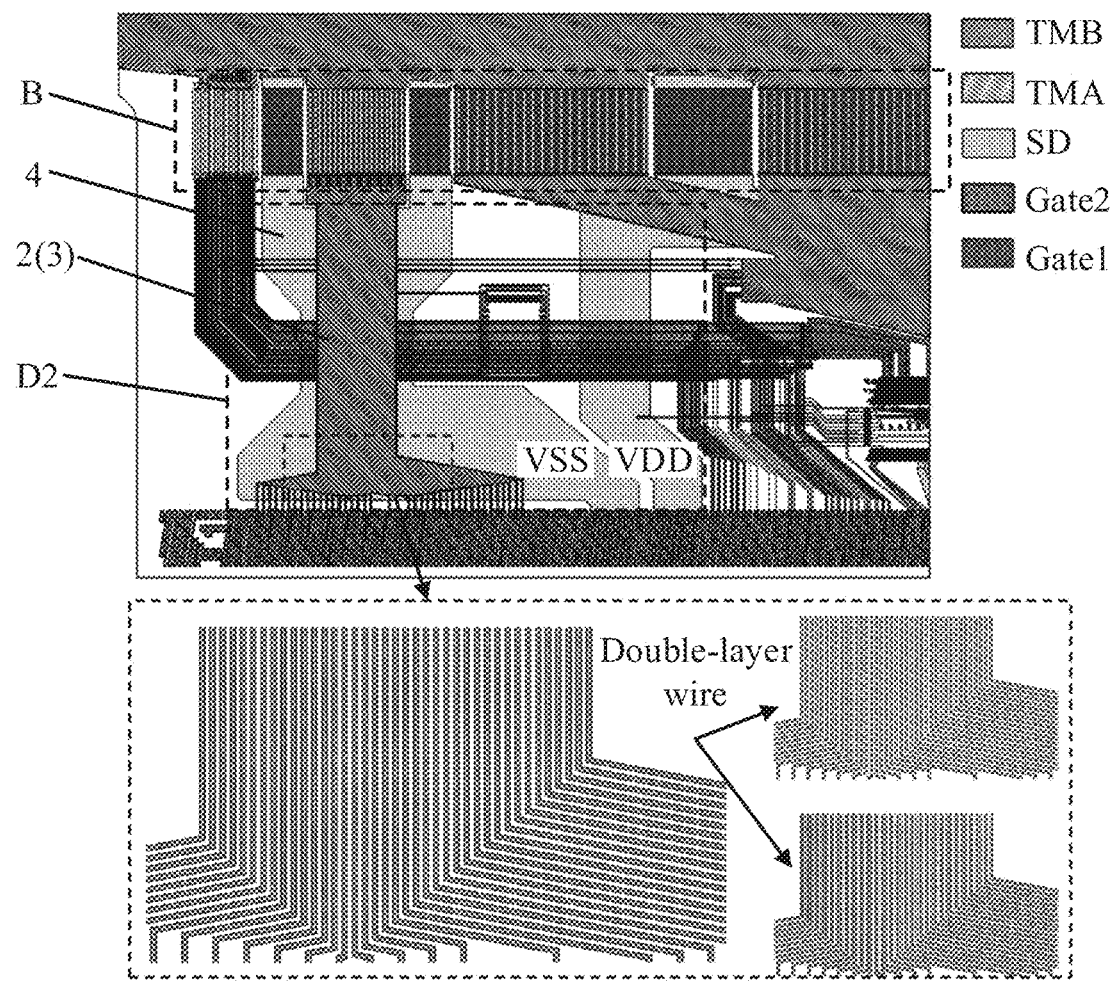
FIG. 1B is an enlarged schematic diagram of a dotted circle D2 in FIG. 1A.
Figure 1C:
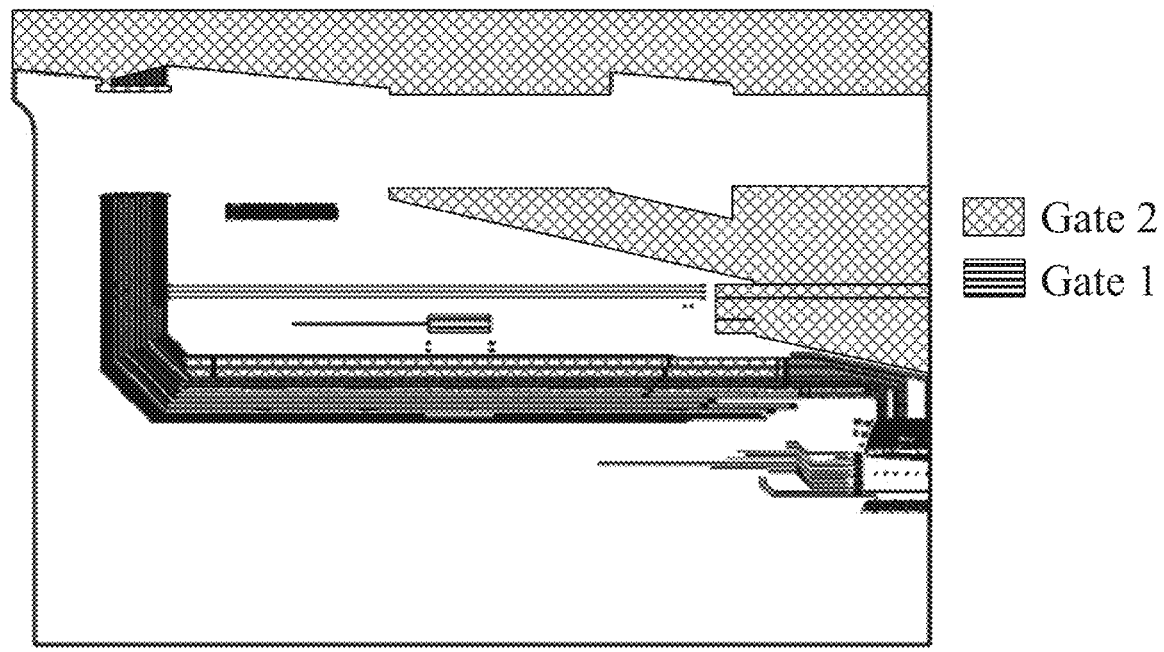
FIG. 1C is a schematic diagram of film layers including a first scanning signal line layer Gate1 and a second scanning signal line layer Gate2 in FIG. 1B.
Figure 1D:
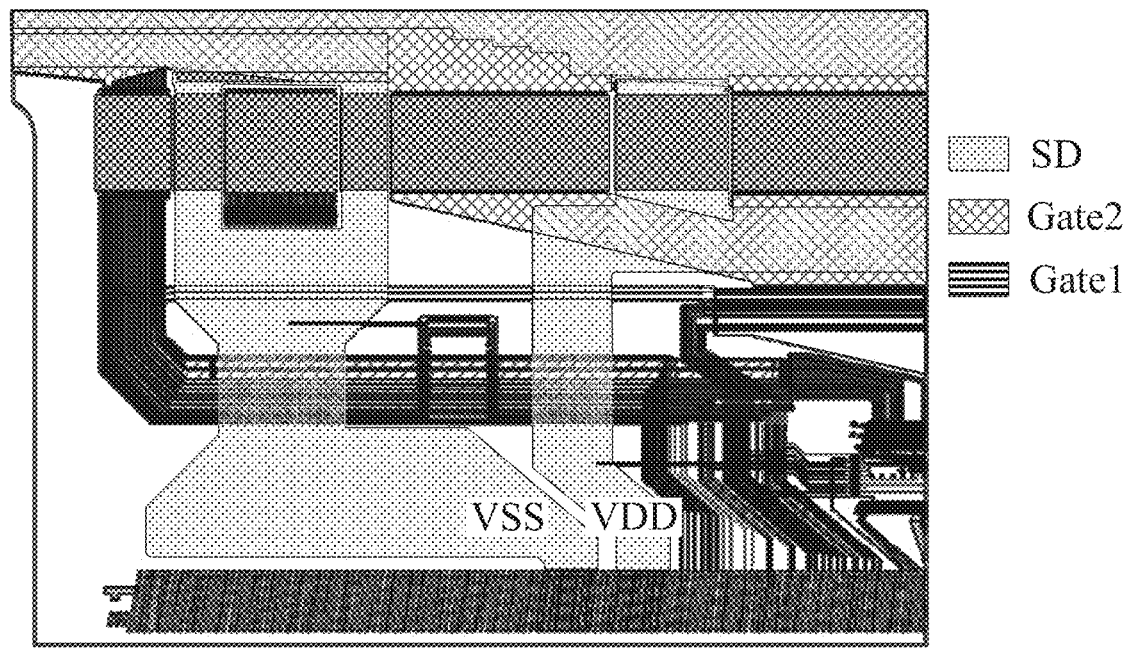
FIG. 1D is a schematic diagram of film layers after superimposing a data line layer in FIG. 1C.

Specifically, the display substrate includes a first touch metal layer located on a side of the base substrate 1, and a second touch metal layer TMB located on a side of the first touch metal layer TMA away from the base substrate 1. Specifically, in combination with FIG. 1B, FIG. 1C, and FIG. 1D, FIG. 1B is an enlarged schematic diagram of the dotted circle D2 in FIG. 1A, FIG. 1C is a schematic diagram of film layers including a first scanning signal line layer Gate1 and a second scanning signal line layer Gate2 in FIG. 1B, FIG. 1D is a schematic diagram of film layers after superimposing the data line layer (SD layer) in FIG. 1C, and FIG. 1B is a schematic diagram of film layers after superimposing the first touch metal layer TMA and the second touch metal layer TMB in FIG. 1D. The touch wires 2 (trace lines) are usually located above the first power supply line 4 (VSS signal line). Specifically, below the bending area B, the touch wires 2 (trace lines) are located on the VSS line formed by the SD layer; and above the bending area B, the touch wires 2 (trace lines) are located on the first power supply line 4 (VSS signal line) formed by the data line layer (SD layer), or above the anode metal layer connected to the data line layer (SD layer), or above the cathode connected to the above-mentioned anode metal layer, the constant voltage signal of the VSS is used for shielding display signals of the backplane (BP), to prevent the touch signal from interacting with the BP Signals (GOA signal and Data signal).

On the film layer structure below the bending area B, GOA signal lines and Data signal lines are often formed by Gate1 and Gate2 layers, as shown in FIG. 1C; and the VSS signal line is formed by the SD layer, as shown in FIG. 1D. The touch wire 2 (trace line) is located directly above the VSS signal line, and is formed by double-layer metals of TMA and TMB, and the double-layer metals are connected together through a via hole of the interlayer dielectric layer 11 (TLD).

Figure 2B:
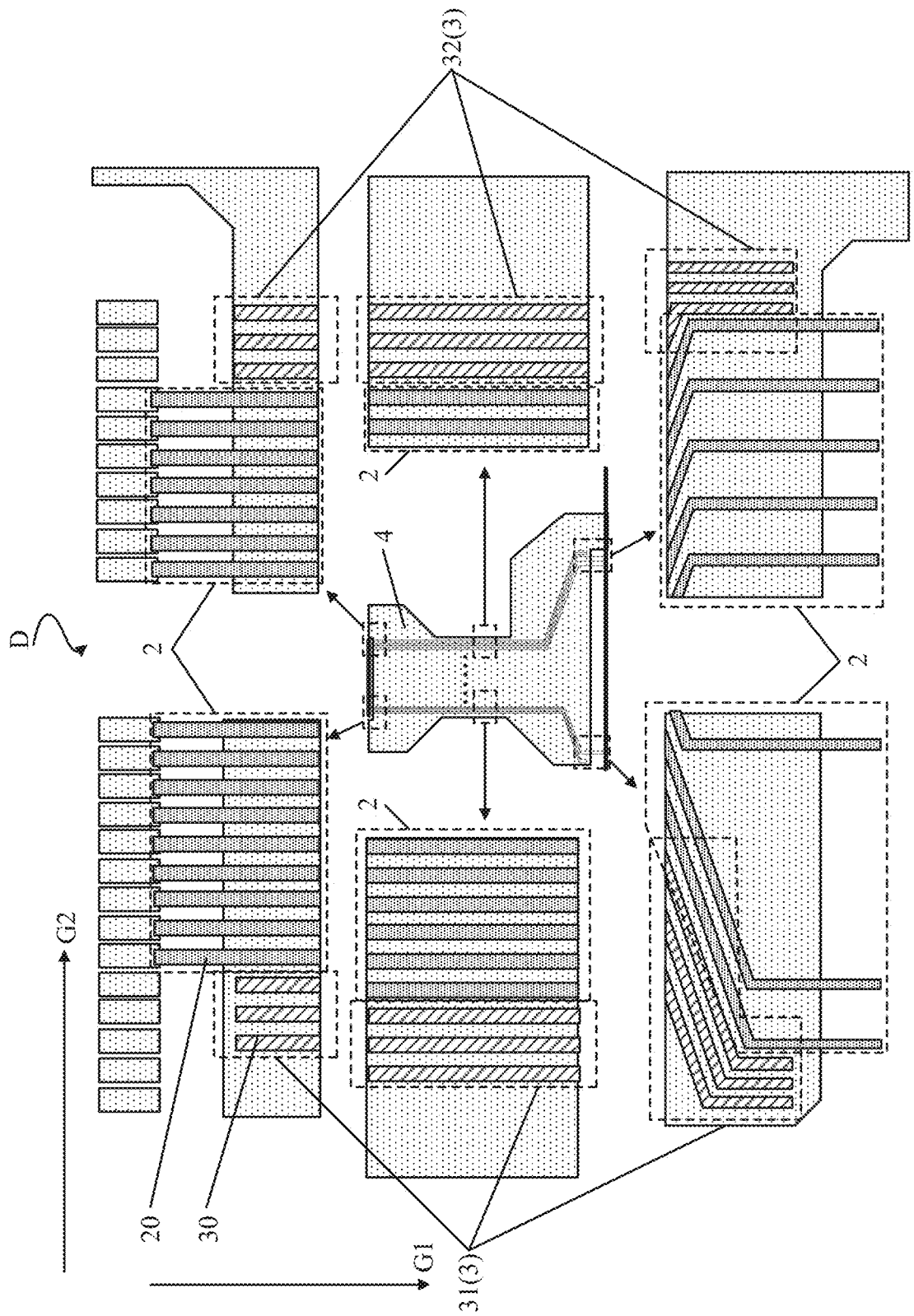
FIG. 2B is a schematic diagram of a stack including a first power supply line 4 and a first touch metal layer TMA.
Figure 2C:
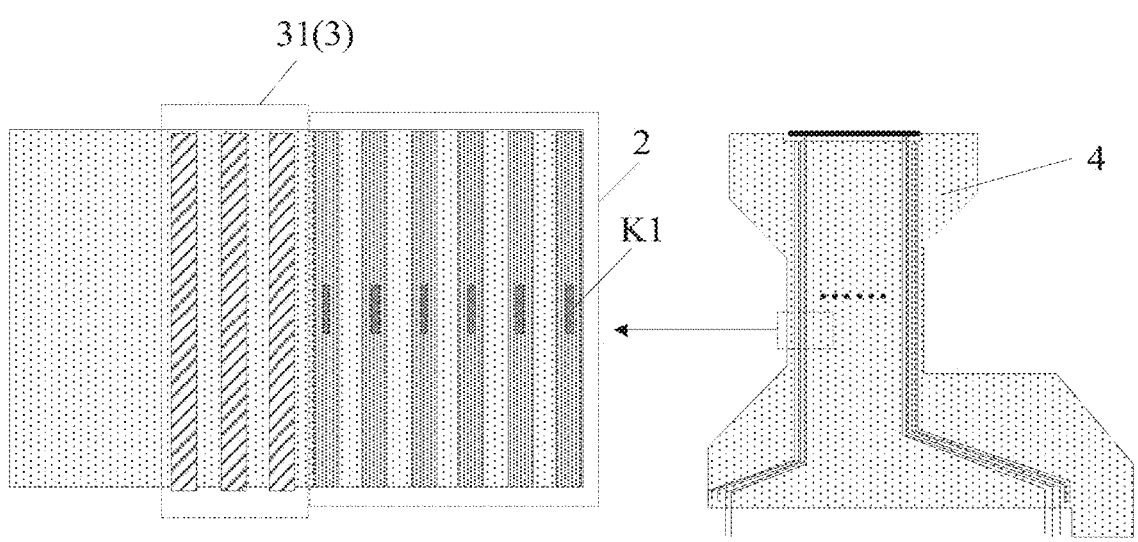
FIG. 2C is a schematic diagram of FIG. 2B after superimposing an interlayer dielectric layer 11.
Figure 3:
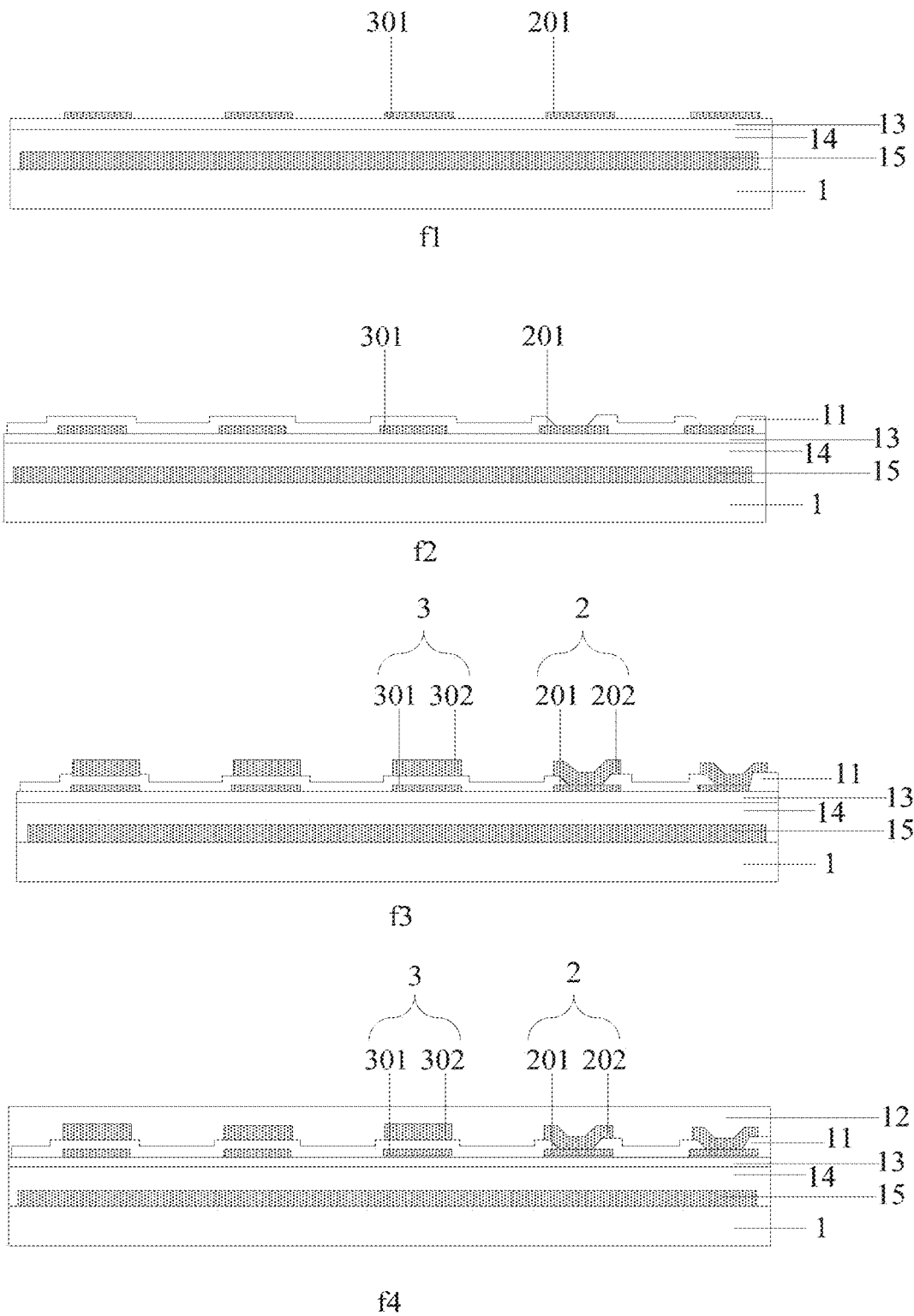
FIG. 3 is a schematic cross-sectional view of FIG. 2A at a dotted line E-E1.

In a specific implementation, the touch wire 20 may be a single-layer wire, or may be a single and double layer alternating wire, that is, a single-layer wire in some positions, and a double-layer wire in some other positions, or may be a single-layer wire in some positions and then a single-layer wire in another layer after the jumper wire. In a possible implementation, in combination with FIG. 2A, FIG. 2B, FIG. 2C, and FIG. 3, FIG. 2B is a schematic diagram of a stack including a first power supply line 4 and a first touch metal layer TMA, FIG. 2C is a schematic diagram of FIG. 2B after superimposing an interlayer dielectric layer 11, FIG. 2A is a schematic diagram of film layers after superimposing the interlayer dielectric layer 11 and the second touch metal layer TMB in FIG. 2B, and FIG. 3 is a schematic cross-section of FIG. 2A at a dotted line E-E1. The touch wire 20 includes a first sub-touch wire 201 and a second sub-touch wire 202 which are stacked; the first floating wire 30 includes a first sub-floating wire 301 and a second sub-floating wire 302 which are stacked; and an orthographic projection of the first sub-floating wire 301 on the base substrate 1 is at least partially coincident with an orthographic projection of the second sub-floating wire 302 on the base substrate 1. The first sub-touch wire 201 and the second sub-touch wire 202 are electrically connected in some areas through a via hole K1 penetrating the interlayer dielectric layer 11; and the first sub-floating wire 301 and the second sub-floating wire 302 are isolated and insulated by the interlayer dielectric layer 11, and are not connected to each other. Specifically, the orthographic projection of the first sub-floating wire 301 on the base substrate 1 may be partially coincident with the orthographic projection of the second sub-floating wire 302 on the base substrate 1, and partially not coincident with the orthographic projection of the second sub-floating wire 302 on the base substrate 1. The orthographic projection of the first sub-floating wire 301 on the base substrate 1 and the orthographic projection of the second sub-floating wire 302 on the base substrate 1 may be all coincident. In this way, during the patterning and etching process, different layers of the sub-wires of the touch wire 20 can be protected.

Specifically, as shown in FIG. 3, a data line 15, a passivation layer 14, and a barrier layer 13 may also be sequentially arranged between the base substrate 1 and the first sub-touch wire 201; an interlayer dielectric layer 11 may be located between the first sub-touch wire 201 and the second sub-touch wire 202; and a protective layer 12 is located on a side of the second touch wire 202 away from the interlayer dielectric layer.

In a possible implementation, the first sub-floating wire and the first sub-touch wire 201 are on the same layer and have the same material, and the second sub-floating wire and the second sub-touch wire 202 are on the same layer and have the same material.

Specifically, the first sub-touch wire 201 of the touch wire 20 and the first sub-floating wire of the first floating wire 30 may both be located on the first touch metal layer, and the second sub-touch wire 202 and the second sub-floating wire may both be located on the second touch metal layer.

Figure 4A:
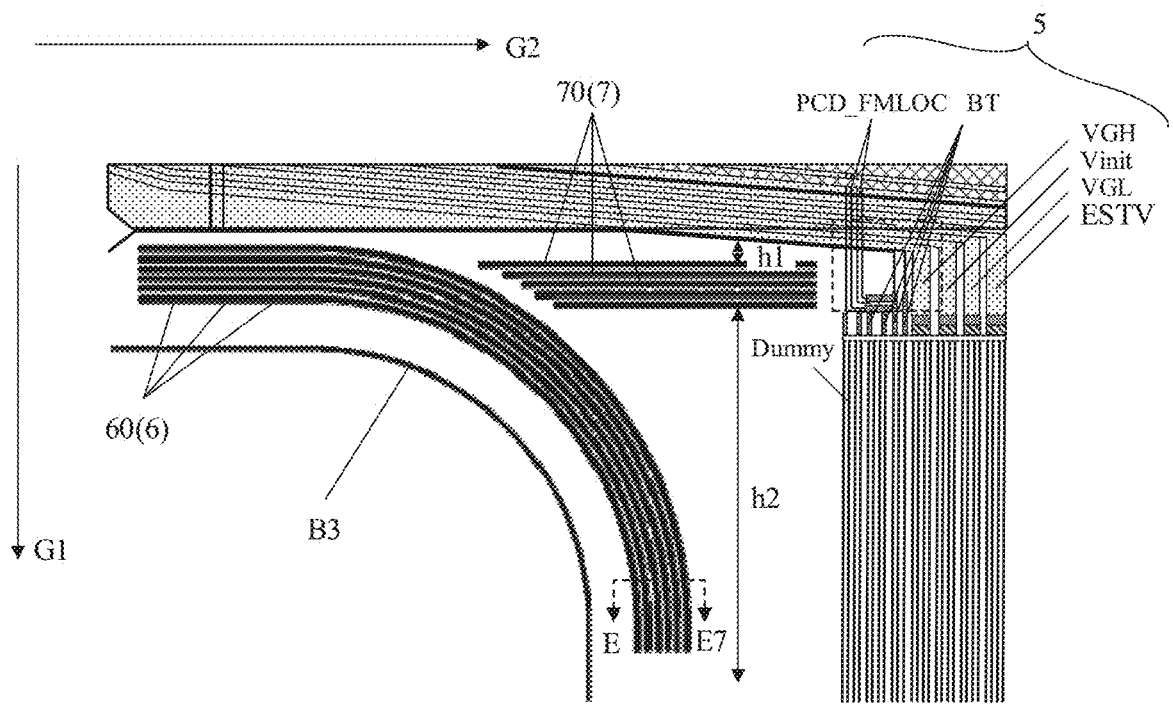
FIG. 4A is an enlarged schematic diagram of a connection edge B3 on a left side of the display substrate.
Figure 4B:
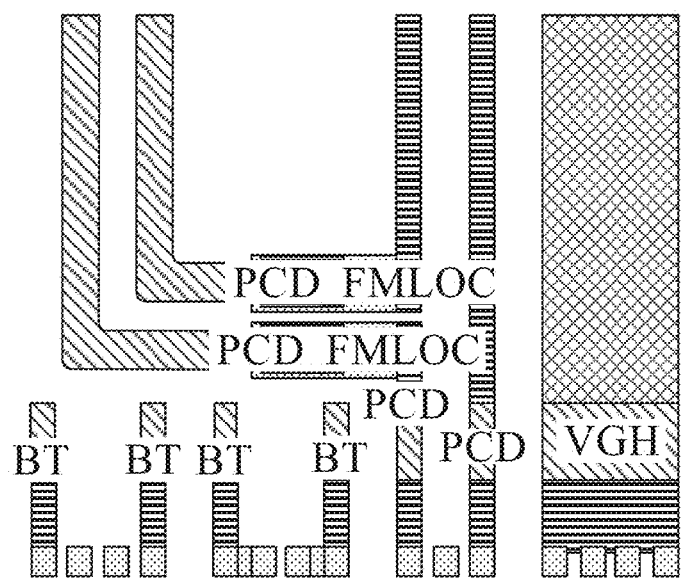
FIG. 4B is an enlarged schematic diagram at the dotted box in FIG. 4A.
Figure 4C:
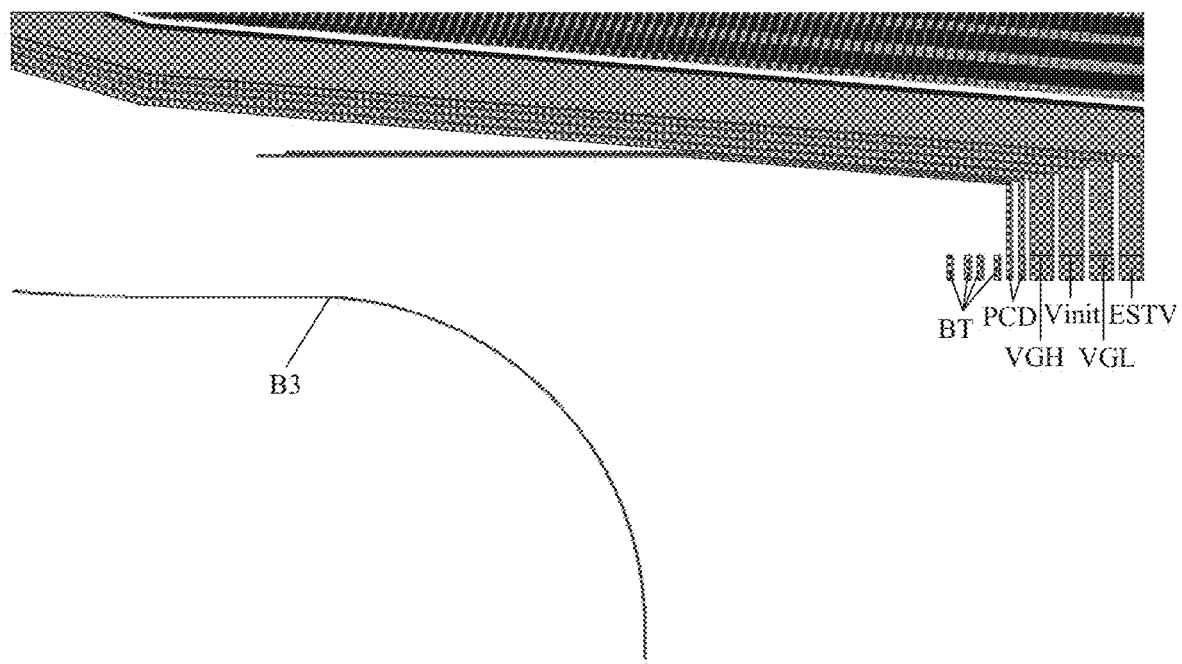
FIG. 4C is a schematic diagram of film layers including the first scanning signal line layer (Gate1 layer) in FIG. 4A.
Figure 4D:
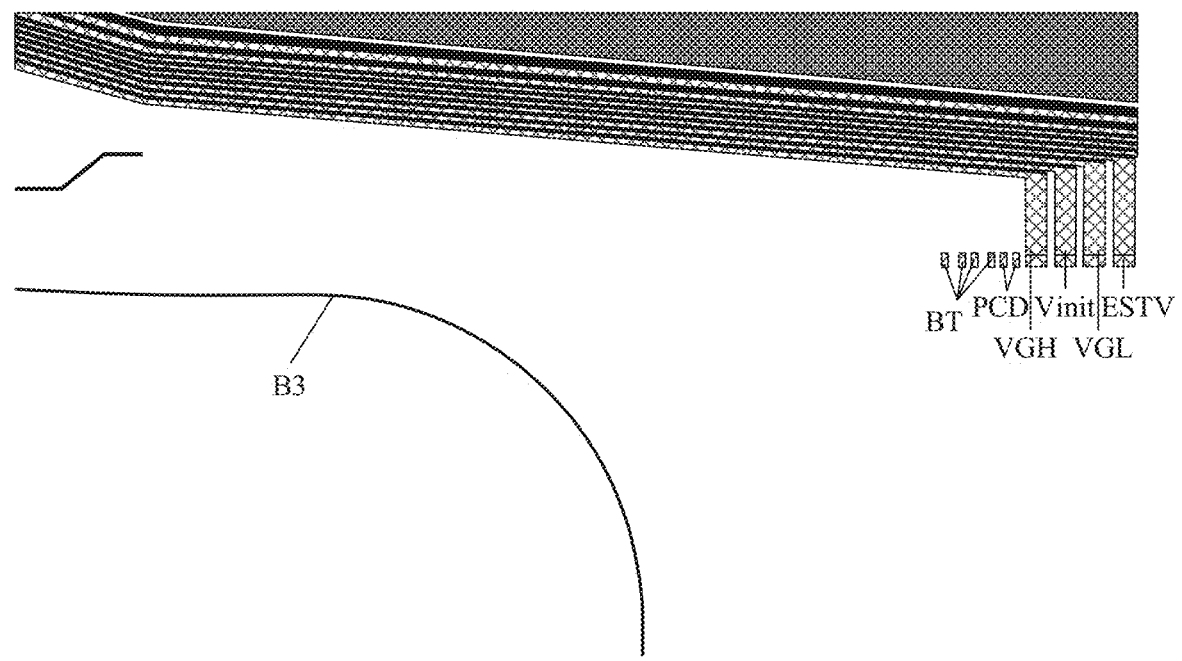
FIG. 4D is a schematic diagram of film layers including the second scanning signal line layer (Gate2 layer) in FIG. 4C.
Figure 4E:
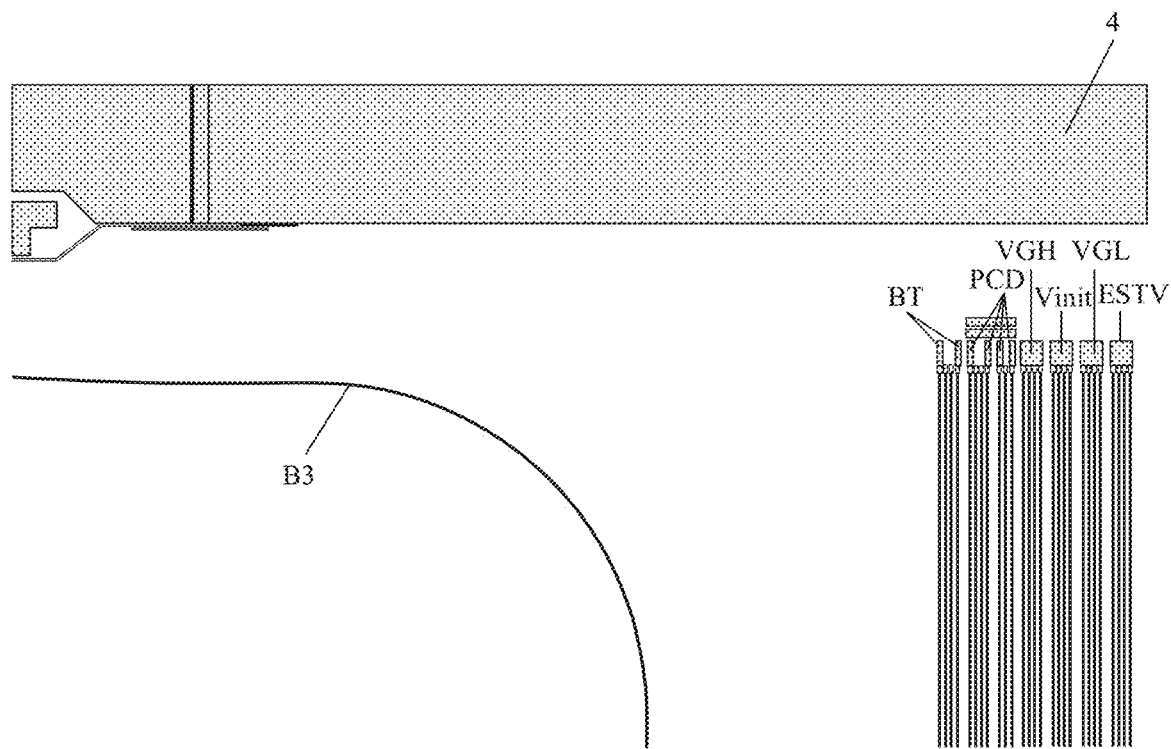
FIG. 4E is a schematic diagram of film layers including the data line layer in FIG. 4A.
Figure 4F:
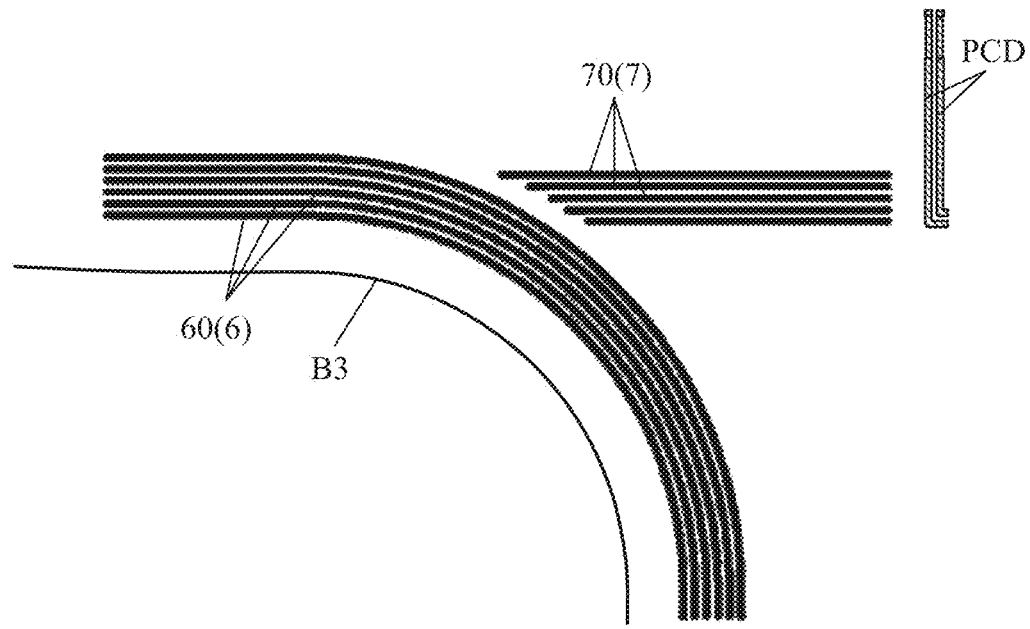
FIG. 4F is a schematic diagram of film layers including the first touch metal layer TMA in FIG. 4A.
Figure 4G:
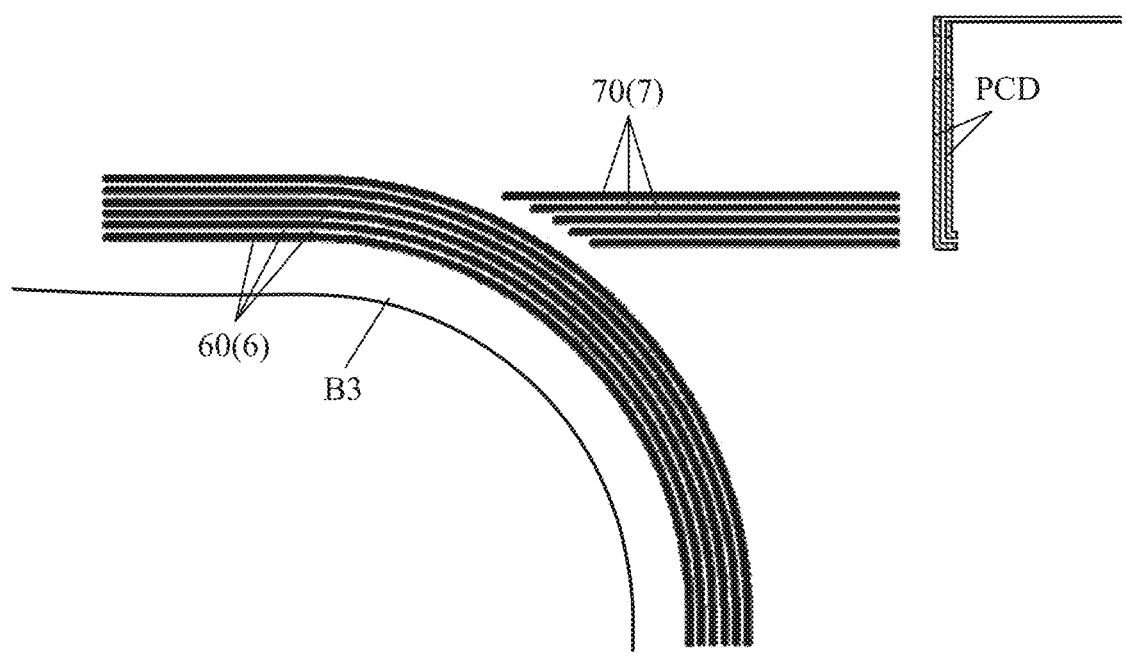
FIG. 4G is a schematic diagram of film layers including the second touch metal layer TMB in FIG. 4A.
Figure 4H:
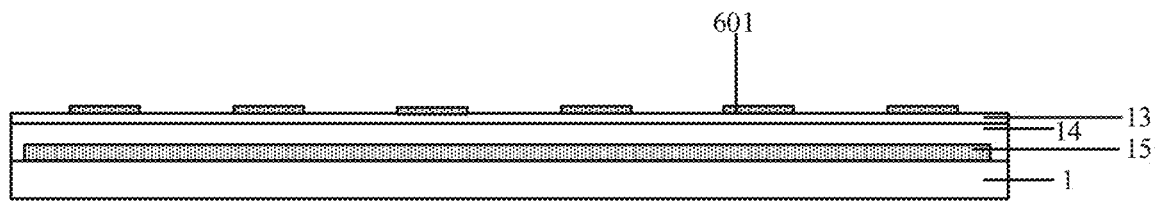
FIG. 4H is a schematic cross-sectional view at the dotted line E-E7 in FIG. 4A.
Figure 4H:
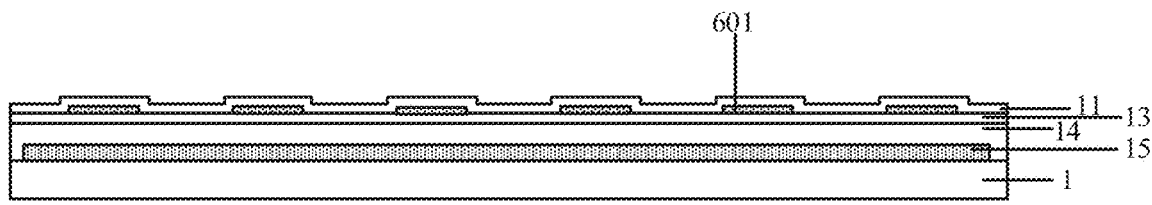
Figure 4H:
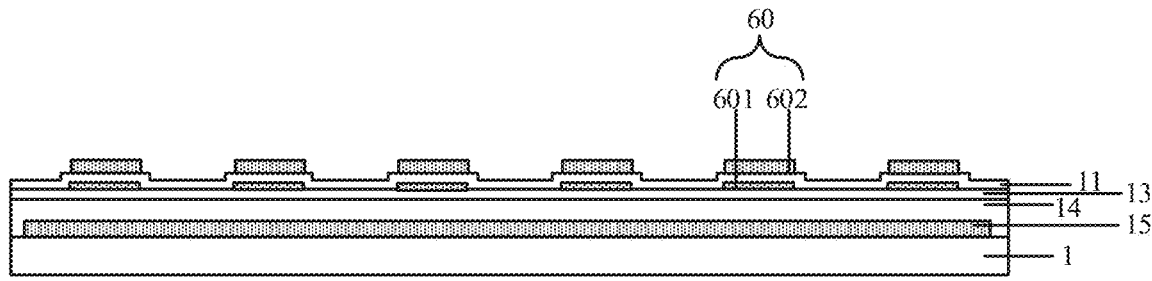
Figure 4H:
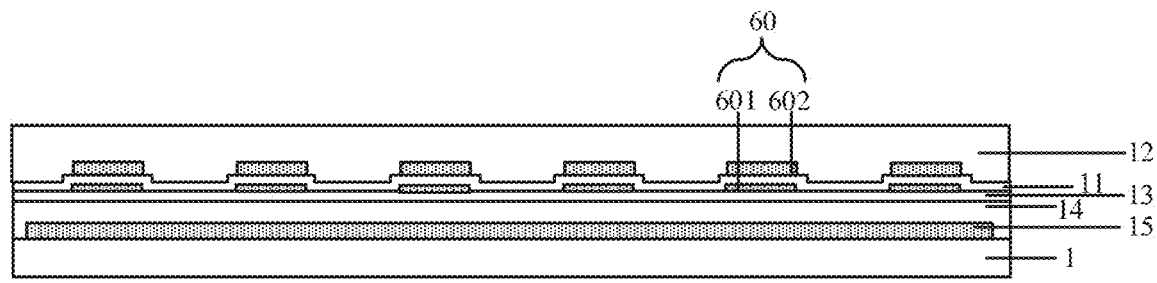
Figure 5A:
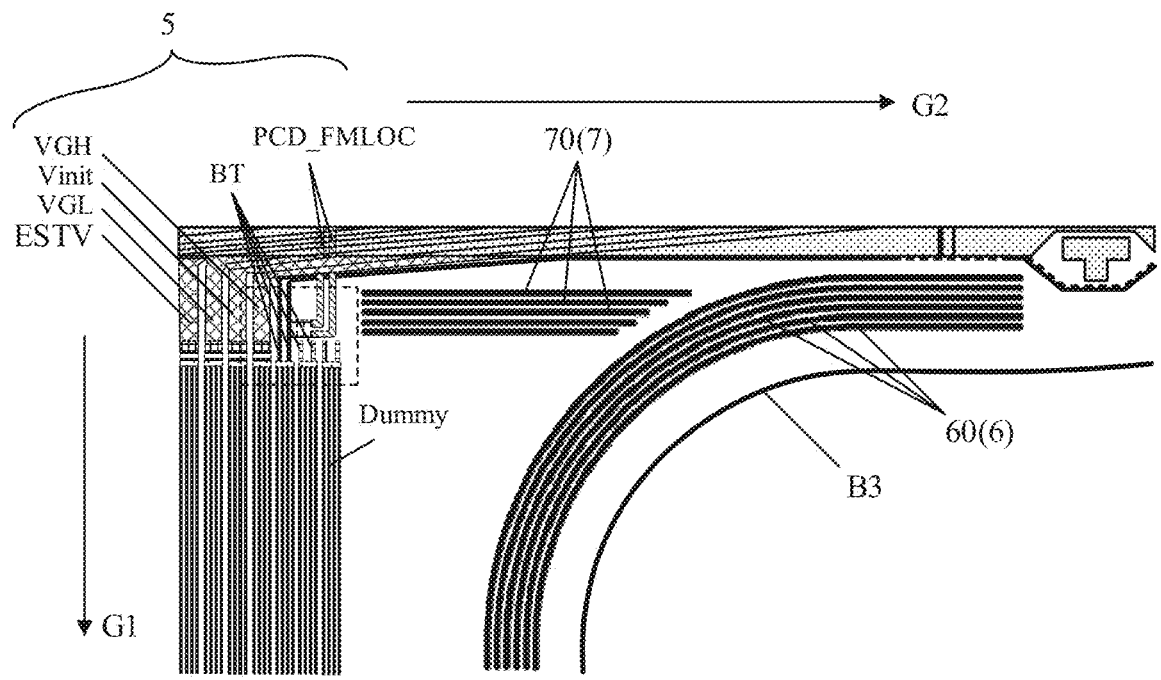
FIG. 5A is an enlarged schematic diagram of a connection edge B3 on a right side of the display substrate.
Figure 5B:
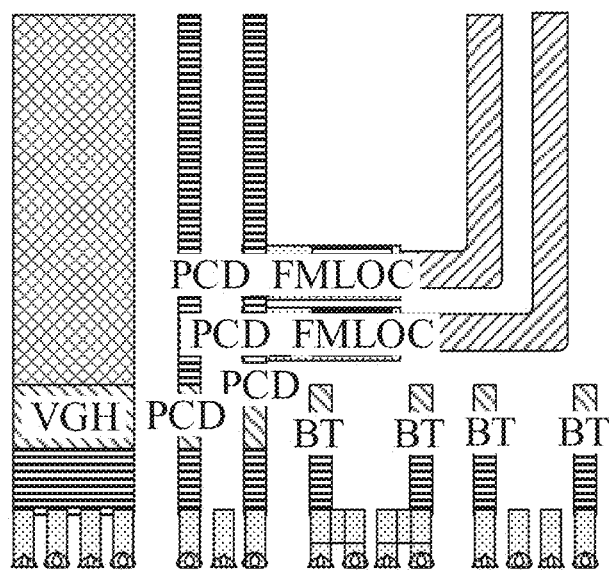
FIG. 5B is an enlarged schematic diagram at the dotted box in FIG. 5A.

In a possible implementation, in combination with FIG. 1A, FIG. 4A, FIG. 4B, FIG. 4C, FIG. 4D, FIG. 4E, FIG. 4F, FIG. 4G, FIG. 4H, FIG. 5A and FIG. 5B, FIG. 4A is an enlarged schematic diagram of a connection edge B3 on a left side of the display substrate, FIG. 5A is an enlarged schematic diagram of a connection edge B3 on a right side of the display substrate; FIG. 4B is an enlarged schematic diagram at the dotted box in FIG. 5A; FIG. 4C is a schematic diagram of film layers including the first scanning signal line layer (Gate1 layer) in FIG. 4A, FIG. 4D is a schematic diagram of film layers including the second scanning signal line layer (Gate2 layer) in FIG. 4C, FIG. 4E is a schematic diagram of film layers including the data line layer (SD layer) in FIG. 4A, FIG. 4F is a schematic diagram of film layers including the first touch metal layer TMA in FIG. 4A, FIG. 4G is a schematic diagram of film layers including the second touch metal layer TMB in FIG. 4A, and FIG. 4H is a schematic cross-section at the dotted line E-E7 in FIG. 4A. The bending area B includes a first edge B1 close to the display area A, a second edge B2 opposite to the first edge B1 and close to the extension area C, and a connection edge B3 that connects the first edge B1 with the second edge B2; and the display substrate includes the signal traveling lines 5 located in the bending area B. The signal traveling lines 5 can be specifically understood as the signal line group closest to the connection edge B3, and may specifically include: a panel periphery detection line PCD-FMLOC for detecting whether the panel periphery is cracked, a bending area detection line BT for detecting whether wires in the bending area are broken, a constant-level high-voltage signal line VGH, a pixel circuit initialization signal line Vinit, a constant-level low-voltage signal line VGL, and a gate drive circuit initialization signal line ESTV. The region between the signal traveling lines 5 and the connection edge B3 has a second floating wiring group 6 surrounding the connection edge B3; and the second floating wiring group 6 includes at least one second floating wire 60, and the second floating wire 60 is electrically insulated from the signal traveling lines 5. In this way, it can provide electrostatic shielding for the signal traveling lines 5, and improve the problem that electrostatic damage is prone to occur at the position (such as the position of dotted boxes in FIG. 4A and FIG. 5A) of the signal traveling lines 5 close to the connection edge B3, resulting in damage to the signal traveling lines.

In a possible implementation, as shown in FIG. 4H, the second floating wire 60 includes a third sub-floating wire 601 and a fourth sub-floating wire 602 which are stacked; and an orthographic projection of the third sub-floating wire 601 on the base substrate 1 is at least partially coincident with an orthographic projection of the fourth sub-floating wire 602 on the base substrate 1. Specifically, the orthographic projection of the third sub-floating wire 601 on the base substrate 1 may be partially coincident with the orthographic projection of the fourth sub-floating wire 602 on the base substrate 1, and partially not coincident with the orthographic projection of the fourth sub-floating wire 602 on the base substrate 1. The orthographic projection of the third sub-floating wire 601 on the base substrate 1 and the orthographic projection of the fourth sub-floating wire 602 on the base substrate 1 may be all coincident. Specifically, the third sub-floating wire 601 and the first sub-floating wire 301 are on the same layer and have the same material, and the fourth sub-floating wire 602 and the second sub-floating wire 302 are on the same layer and have the same material.

In a possible implementation, in combination with FIG. 4A, FIG. 4B, FIG. 4C, FIG. 4D, FIG. 4E, FIG. 4F, FIG. 4G, FIG. 4H, FIG. 5A and FIG. 5B, the display substrate further includes a third floating wiring group 7 located on a side of the second floating wiring group 6 away from the connection edge B3; and the third floating wiring group 7 includes at least one third floating wire 70 extending along the second direction G2. In this way, it can provide better electrostatic shielding for the signal traveling lines 5, and improve the problem that electrostatic damage is prone to occur at the position of the signal traveling lines 5 close to the connection edge B3, resulting in damage to the signal traveling lines 5 or the circuit unit connected thereto.

In a possible implementation, the third floating wire 70 includes a fifth sub-floating wire and a sixth sub-floating wire which are stacked; and the orthographic projection of the fifth sub-floating wire on the base substrate 1 is at least partially coincident with the orthographic projection of the sixth sub-floating wire on the base substrate 1. Specifically, the orthographic projection of the fifth sub-floating wire on the base substrate 1 may be partially coincident with the orthographic projection of the sixth sub-floating wire on the base substrate 1, and partially not coincident with the orthographic projection of the sixth sub-floating wire on the base substrate 1. The orthographic projection of the fifth sub-floating wire on the base substrate 1 and the orthographic projection of the sixth sub-floating wire on the base substrate 1 may be all coincident. Specifically, the fifth sub-floating wire and the first sub-floating wire are on the same layer and have the same material, and the sixth sub-floating wire and the second sub-floating wire are on the same layer and have the same material.

In a possible implementation, as shown in FIG. 4A and FIG. 5A, in the direction perpendicular to the second edge B2, a minimum distance h1 between the third floating wiring group 7 and the signal traveling lines 5 is smaller than the distance h2 between the third floating wiring group 7 and the second edge B2. That is, as shown in FIG. 4A or FIG. 5A, in the direction perpendicular to the second edge B2, the third floating wiring group 7 is located at an upper position; and therefore, the location where the third floating wiring group 7 is located is relatively large, there may be more wiring space, and the third floating wires 70 may extend longer to achieve a better electrostatic shielding effect.

Figure 6:
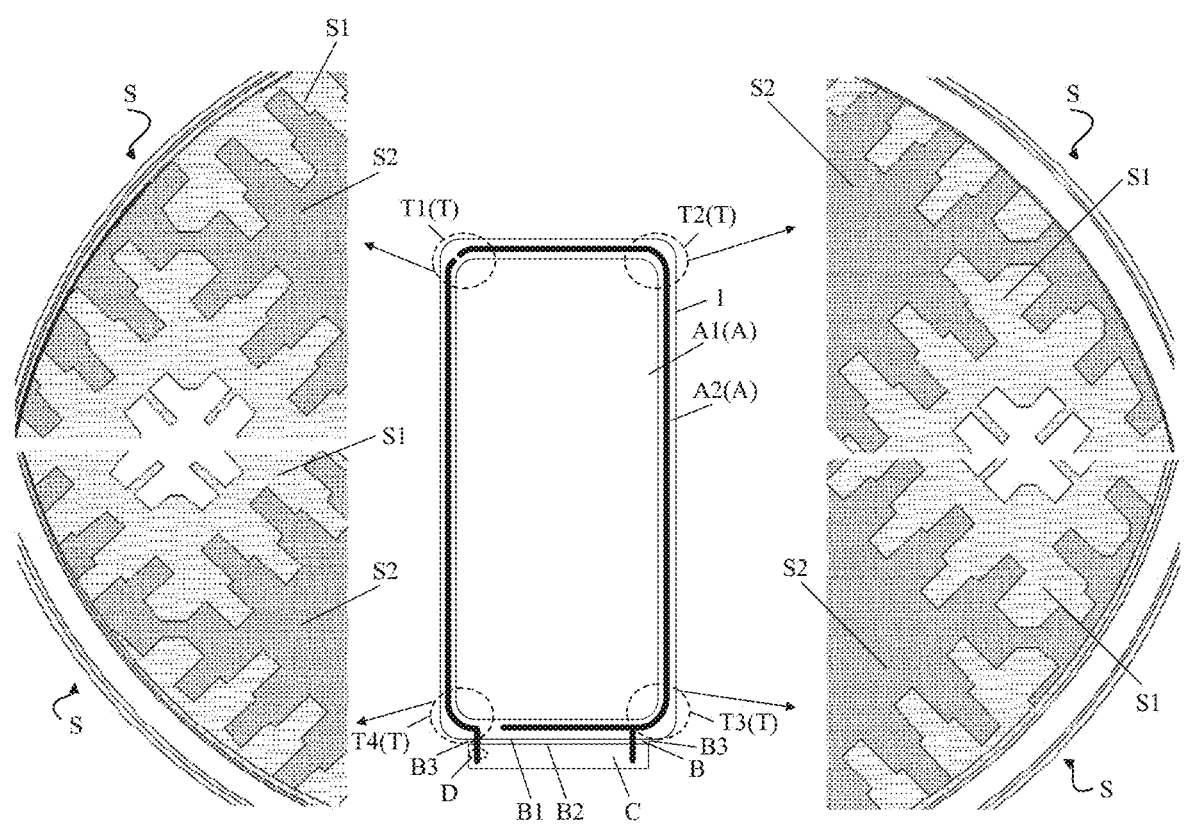
FIG. 6 is a second schematic top view of a display substrate according to embodiments of the present disclosure.
Figure 7:
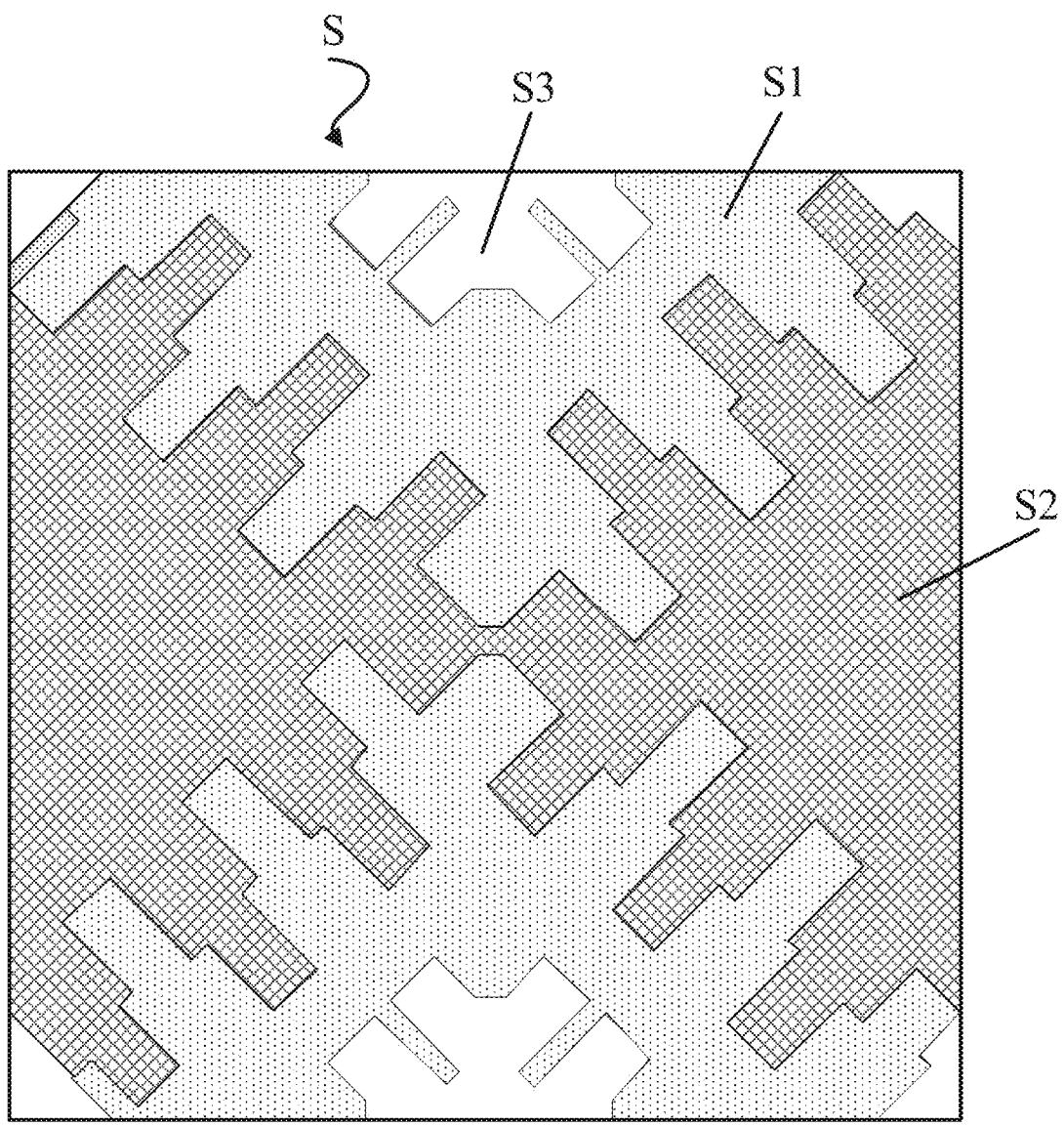
FIG. 7 is a schematic diagram of a complete touch unit in FIG. 6.

In a possible implementation, in combination with FIG. 1A, FIG. 6 and FIG. 7, FIG. 6 includes an enlarged schematic diagram of different corner positions of the display substrate, and FIG. 7 is a schematic diagram of a complete touch unit S. The display area A includes a touch area A1 having touch electrodes, and a lead area A2 surrounding the touch area A1 and having touch leads 8; where, the touch electrodes include a plurality of first touch electrodes S1 extending along the first direction G1, and a plurality of second touch electrodes S2 extending along the second direction G2 and insulated from the first touch electrodes S1; and the first touch electrodes S1 intersect with the second touch electrodes S2 to form a plurality of touch units S. The control lead 8 includes first touch leads 81 electrically connected to the first touch electrodes S1 in one-to-one correspondence (the position marked 81 in FIG. 1 may specifically include a plurality of first touch leads 81), and second touch leads 82 electrically connected to the second touch electrodes S2 in one-to-one correspondence (the position marked 82 in FIG. 1A may specifically include a plurality of second touch leads 82); and the first touch leads 81 and the second touch leads 82 each has double-layer sub-leads. At the corner position T, as shown in FIG. 6 and FIG. 7, because the integrity of the touch unit S (sensor) is worse than that of the normal area, the mutual capacitance value between the first touch electrode S1 (specifically, it may be the transmitting electrode Tx) and the second touch electrode S2 (specifically, it may be the receiving electrode Rx) is smaller than that of the normal area. When the mutual capacitance value is too small, the phenomenon of weak anti-noise ability of the sensor is likely to occur, which is manifested by the large amount of noises at the rounded corners and the hole position. In the embodiments of the present disclosure, the lead area A2 includes a first compensation capacitor C1 electrically connected to the touch lead 8 at at least one corner position T, which can realize compensation of the mutual capacitance value at the corner position T, to improve the problem that the mutual capacitance value of the display substrate at the corner position T is too small, which is prone to the phenomenon that the sensor is weak in anti-noise ability and the amount of noises is large.

Figure 8:
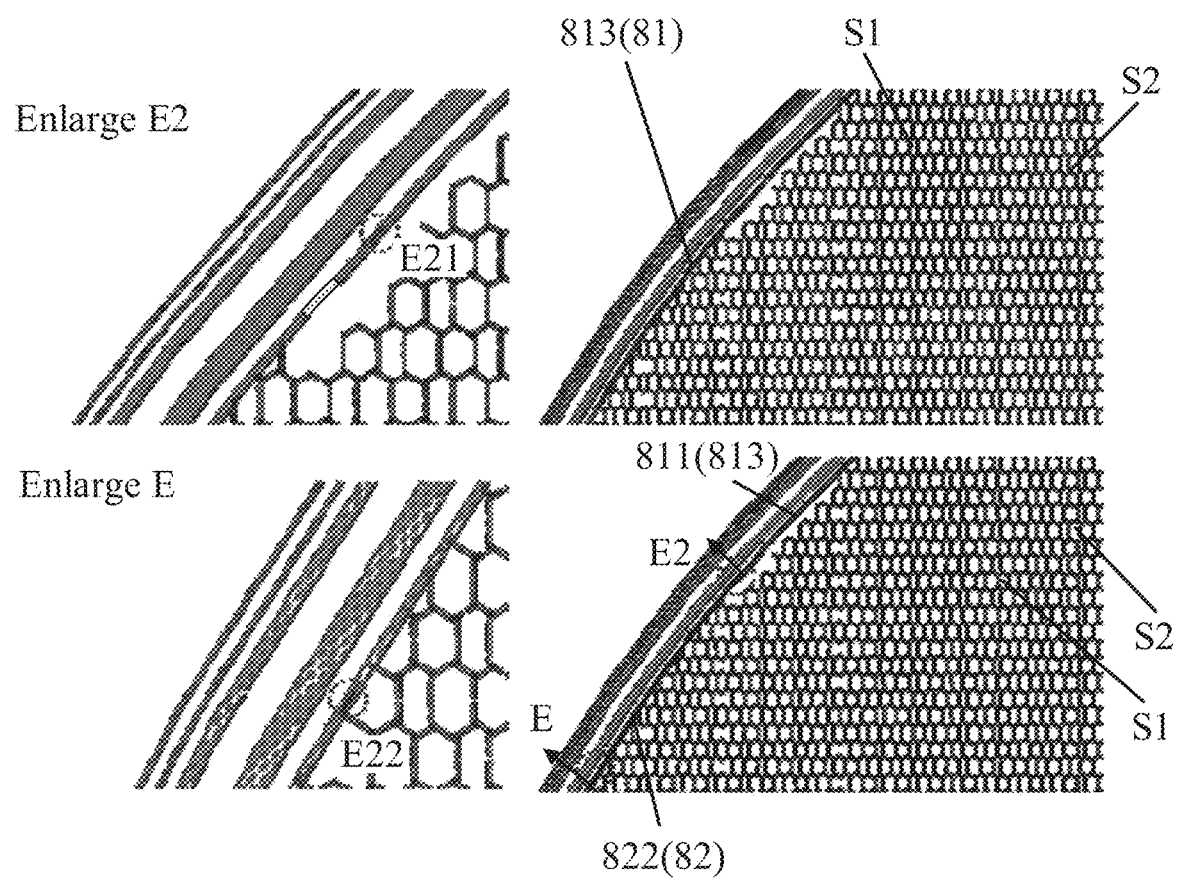
FIG. 8 is an enlarged schematic diagram of the upper left corner position T1 in FIG. 6.
Figure 9:
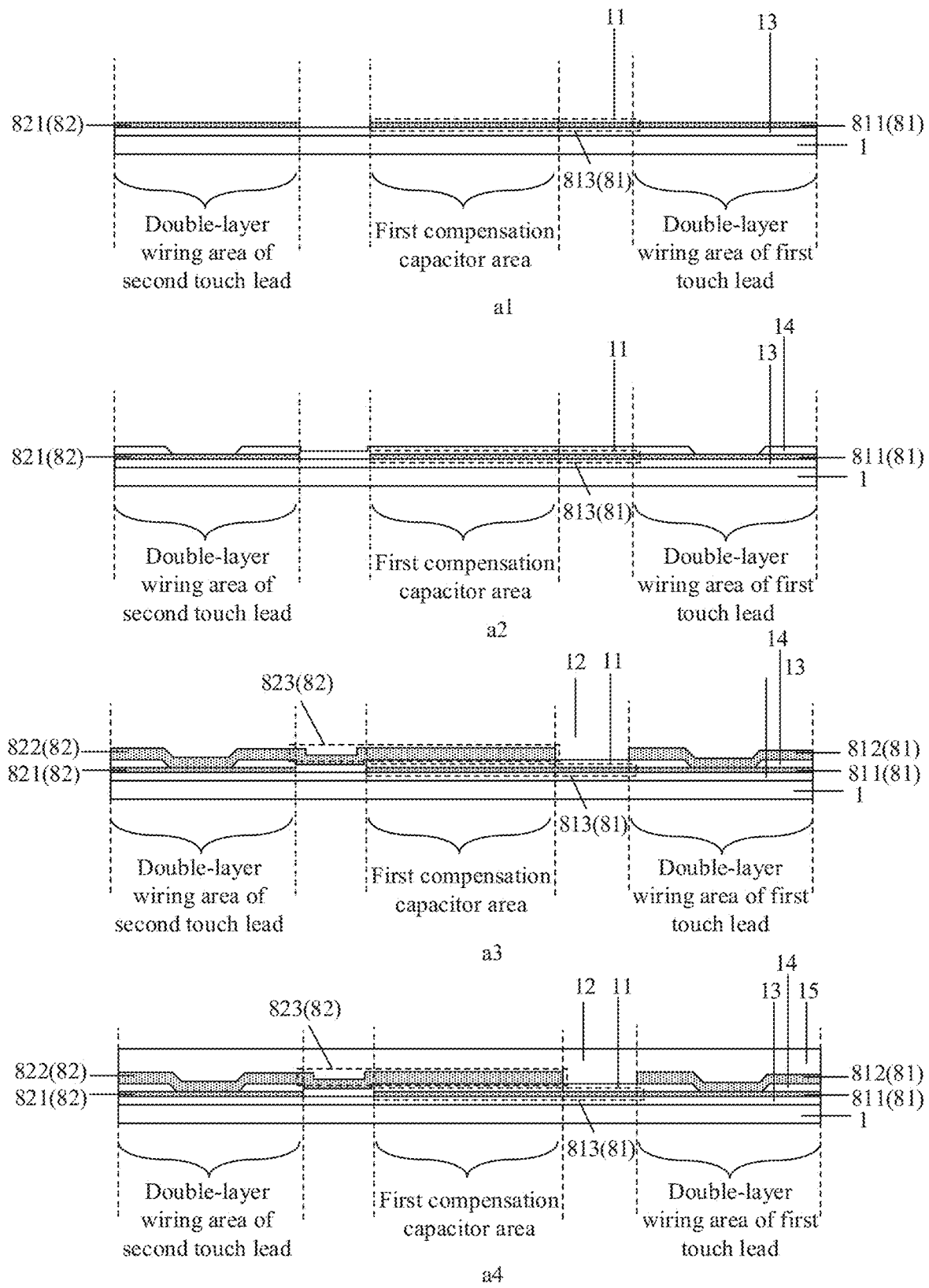
FIG. 9 is a first schematic cross-sectional view along the dotted line E-E2 in FIG. 8.

In a possible implementation, as shown in FIG. 8 and FIG. 9, the first touch lead 81 includes a first sub-touch lead 811 and a second sub-touch lead 812 which are stacked, the second touch lead 82 includes a third sub-touch lead 821 and a fourth sub-touch lead 822 which are stacked, the first sub-touch lead 811 and the third sub-touch lead 821 are on the same layer and have the same material, and the second sub-touch lead 812 and the fourth sub-touch lead 822 are on the same layer and have the same material; and at the corner position T having the first touch lead 81 and the second touch lead 82 (for example, as shown in FIG. 6, the upper left corner position T1 of the display substrate), the display substrate includes the first compensation capacitor C1 formed by mutual extension of different layers of sub-leads of the first touch lead 81 and the second touch lead 82. In this way, it can realize compensation of the mutual capacitance value at the upper left corner position T1, and improve the problem that the mutual capacitance value of the display substrate at the corner position T is too small, which is prone to the phenomenon that the touch unit (sensor) is weak in anti-noise ability and the amount of noises is large.

Figure 10:
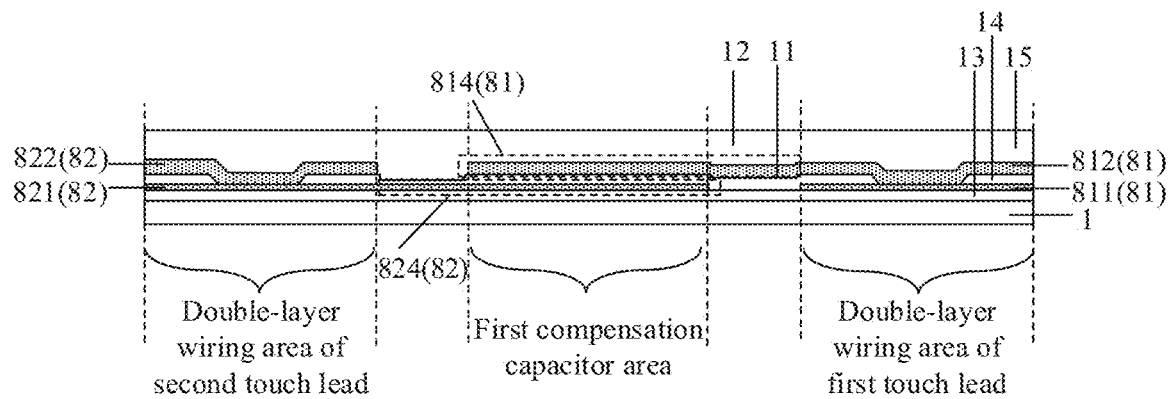
FIG. 10 is a second schematic cross-sectional view along the dotted line E-E2 in FIG. 8.

Specifically, in combination with FIG. 8, FIG. 9 and FIG. 10, FIG. 8 is a schematic diagram of the enlarged structure corresponding to the upper left corner position T1 in FIG. 1A, and FIG. 9 and FIG. 10 are schematic cross-sections along the dotted line E-E2 in FIG. 8. The upper and lower diagrams on the left side of FIG. 8 are enlarged schematic diagrams of the lower right diagram in FIG. 8 at different positions, and the upper diagram on the right side of FIG. 8 mainly shows the first lead extension part 813 extending from the first sub-touch lead 811. Here, the enlarged diagram at the position E2 shows that the first touch lead 81 is connected by double-layer punching at the position E21, and from this position, the first touch lead 81 turns into the single-layer wire (the first lead extension part 813) located on the first touch metal layer TMA; and the enlarged diagram at the position E shows that the second touch lead 82 is connected by double-layer punching at the position E22, and from this position, the second touch lead 82 turns into the single-layer wire located on the second touch metal layer TMB. At the corner position T having the first touch lead 81 and the second touch lead 82 (that is, at the upper left corner position T1), the first touch lead 81 closest to the touch area A1 has a first lead extension part 813 extending from the first sub-touch lead 811, the second touch lead 82 closest to the touch area A1 has a fourth lead extension part 823 extending along the fourth sub-touch lead 822, and the orthographic projection of the first lead extension part 813 on the base substrate 1 overlaps with the orthographic projection of the fourth lead extension part 823 on the base substrate 1, to form a first compensation capacitor C1. Or, as shown in FIG. 10, at the corner position T having the first touch lead 81 and the second touch lead 82 (that is, at the upper left corner position T1), the first touch lead 81 closest to the touch area A1 has a second lead extension part 814 extending from the second sub-touch lead 812, the second touch lead 82 closest to the touch area A1 has a third lead extension part 824 extending along the third sub-touch lead 821, and the orthographic projection of the second lead extension part 814 on the base substrate 1 overlaps with the orthographic projection of the third lead extension part 824 on the base substrate 1 to form the first compensation capacitor C1.

Specifically, the first touch electrode S1, the first sub-touch lead 811, and the third touch lead 821 may all be located on the first touch metal layer; and the second touch electrode S2, the second sub-touch lead 812, the four sub-touch lead 822 may all be located on the second touch metal layer. The touch leads 8 in the display area A can be electrically connected to the touch leads in the extension area C in one-to-one correspondence.

Figure 11:
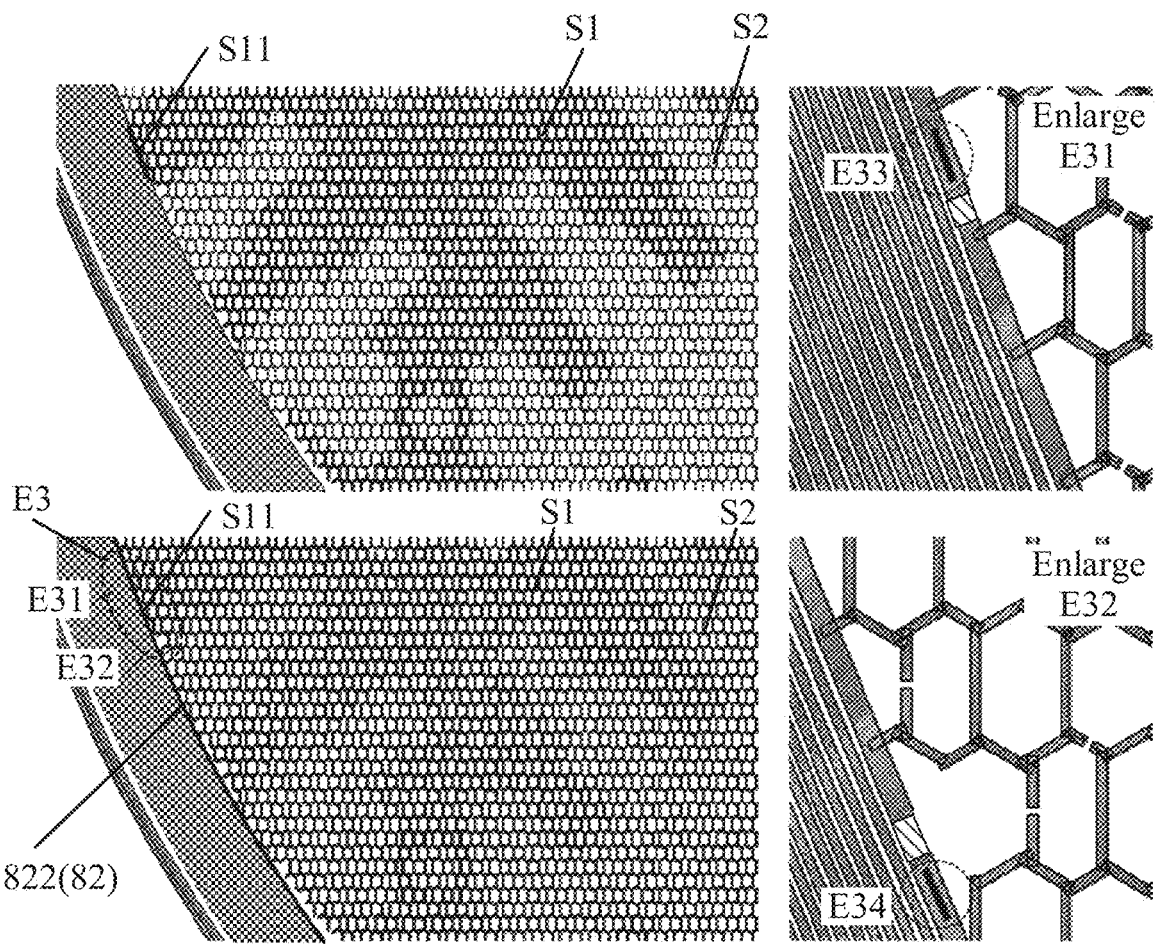
FIG. 11 is an enlarged schematic diagram of the lower left corner position T4 in FIG. 6.
Figure 12:
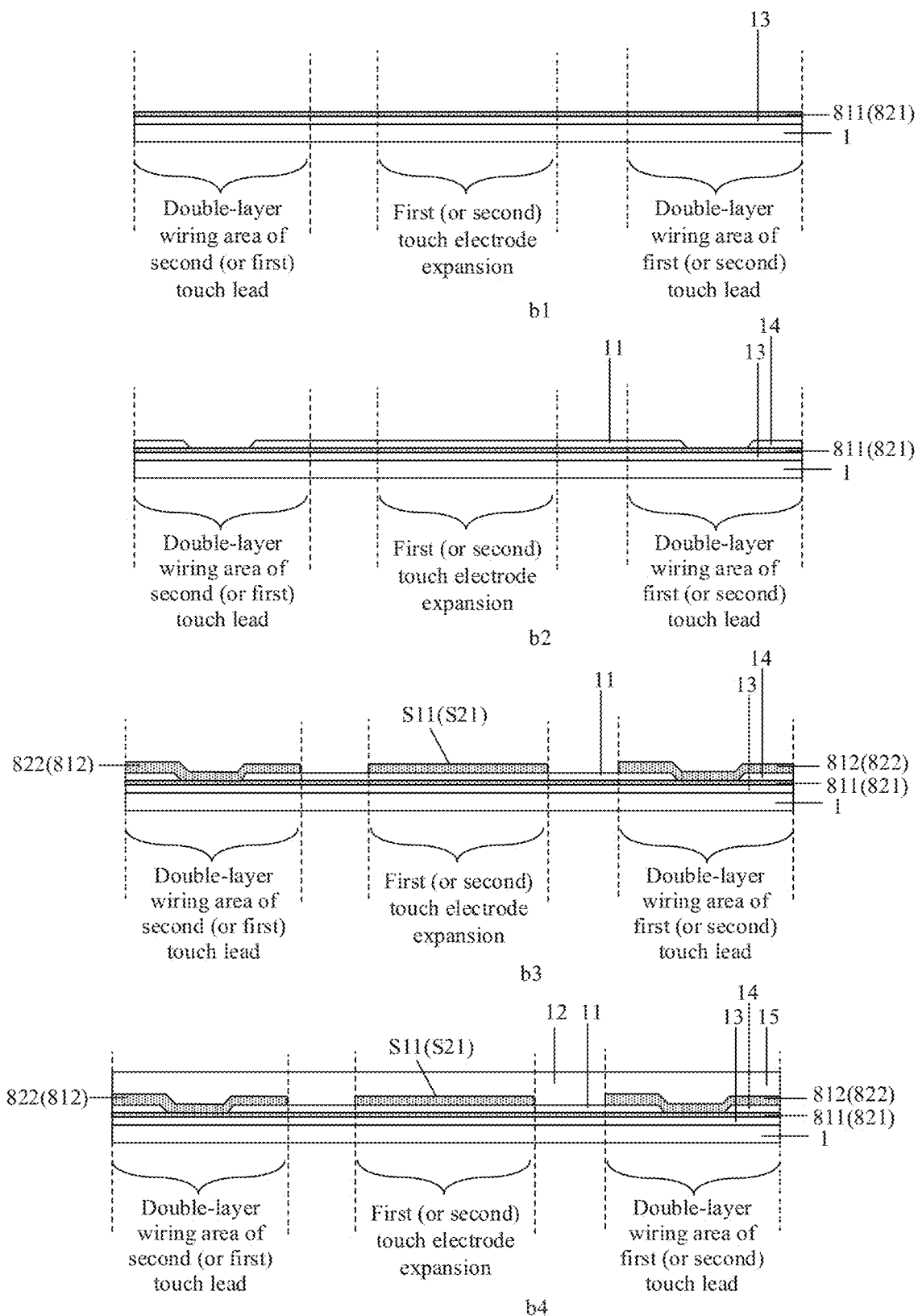
FIG. 12 is a schematic cross-sectional view at the dotted circle in FIG. 11.

In a possible implementation, as shown in FIG. 11 and FIG. 12, FIG. 12 is a schematic cross-sectional view of the dotted circle E3 in FIG. 11; and the upper and lower diagrams on the right side of FIG. 11 are enlarged schematic diagrams of the lower left diagram of FIG. 11 at different positions, and the upper left diagram of FIG. 11 mainly shows a first touch electrode extension part S11 extending from the first touch electrode S1 closest to the touch area A1. Here, the enlarged diagram at the position E31 shows that the second touch lead 82 is connected by double-layer punching at the position E31, and the enlarged diagram at the position E32 shows that the second touch lead 82 is connected by double-layer punching at the position E32. At the corner position T having only the second touch lead 82 (that is, at the lower left corner position T4), the display substrate in the lead area A2 further includes a first touch electrode extension part S11 extending from the first touch electrode S1 closest to the touch area A1; and the display substrate includes a first compensation capacitor formed by the first touch electrode extension part S11 and the second touch lead 82. In this way, it realizes compensation of the mutual capacitance value at the lower left corner position T4, and improves the problem that the mutual capacitance value of the display substrate at the lower left corner position T4 is too small, which is prone to the phenomenon of weak anti-noise ability of the touch unit (sensor), and the amount of noises is large.

Specifically, as shown in FIG. 11 and FIG. 12, the first touch electrode extension part S11 is on the same layer as the fourth sub-touch lead 822, that is, the first touch electrode extension part S11 and the first touch electrode S1 are on the same layer, and both are located on the second touch metal layer. At the corner position T having only the second touch lead 82 (that is, at the lower left corner position T4), the orthographic projection of the first touch electrode extension part S11 on the base substrate 1 is partially overlapped with the orthographic projection of the third sub-touch lead 821 on the base substrate 1 to form a first compensation capacitor C1. In this way, the first touch electrode extension part S11 is formed by expanding the first touch electrode S1, so that the orthographic projection of the first touch electrode extension part S11 on the base substrate 1 overlaps the orthographic projection of the sub-lead, i.e., the third sub-touch lead 821 on the lower layer of the second touch lead 82 on the base substrate 1 to form the first compensation capacitor C1.

Figure 13:
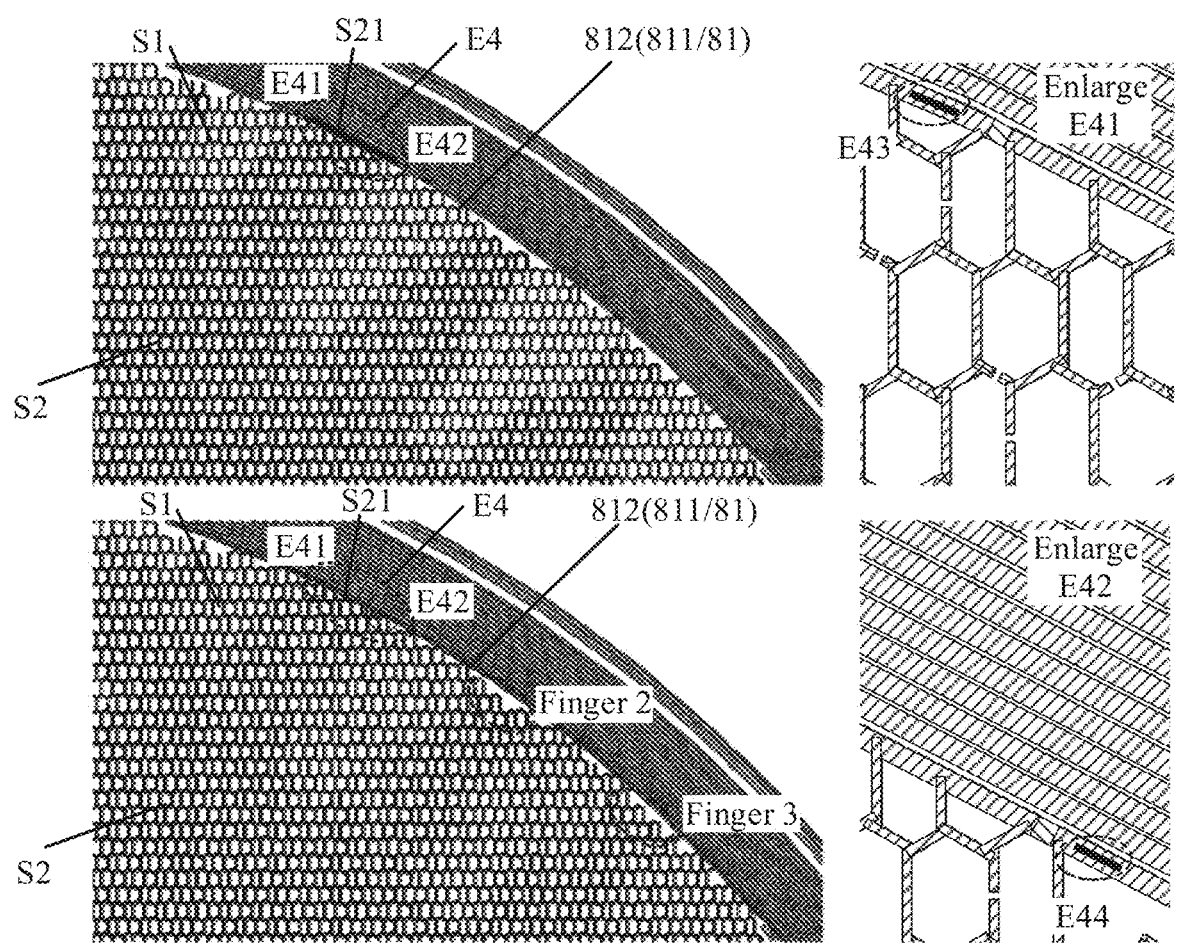
FIG. 13 is an enlarged schematic diagram of the upper right corner position T2 in FIG. 6.
Figure 14:
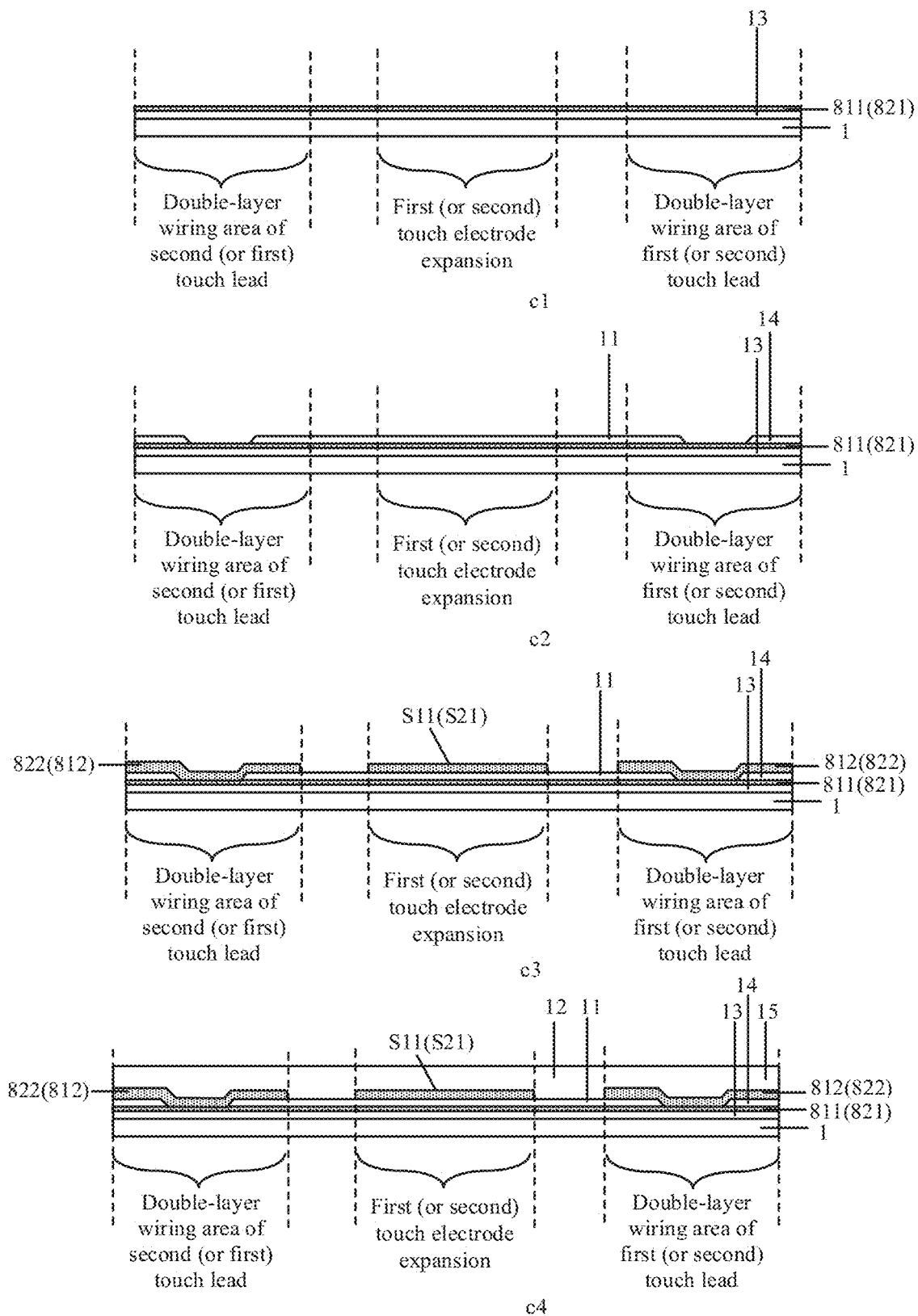
FIG. 14 is a schematic cross-sectional view at the dotted circle in FIG. 13.
Figure 15:
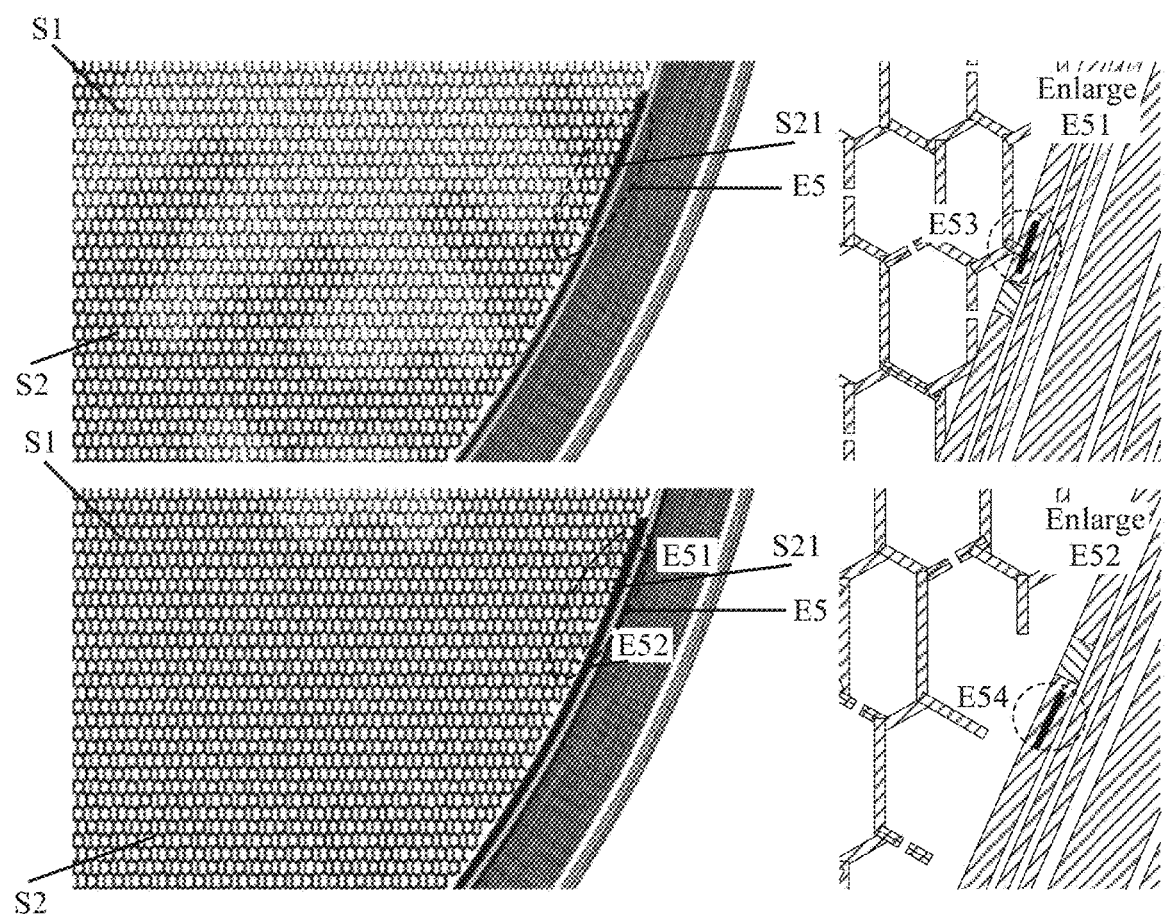
FIG. 15 is an enlarged schematic diagram of the lower right corner position T2 in FIG. 6.
Figure 16:
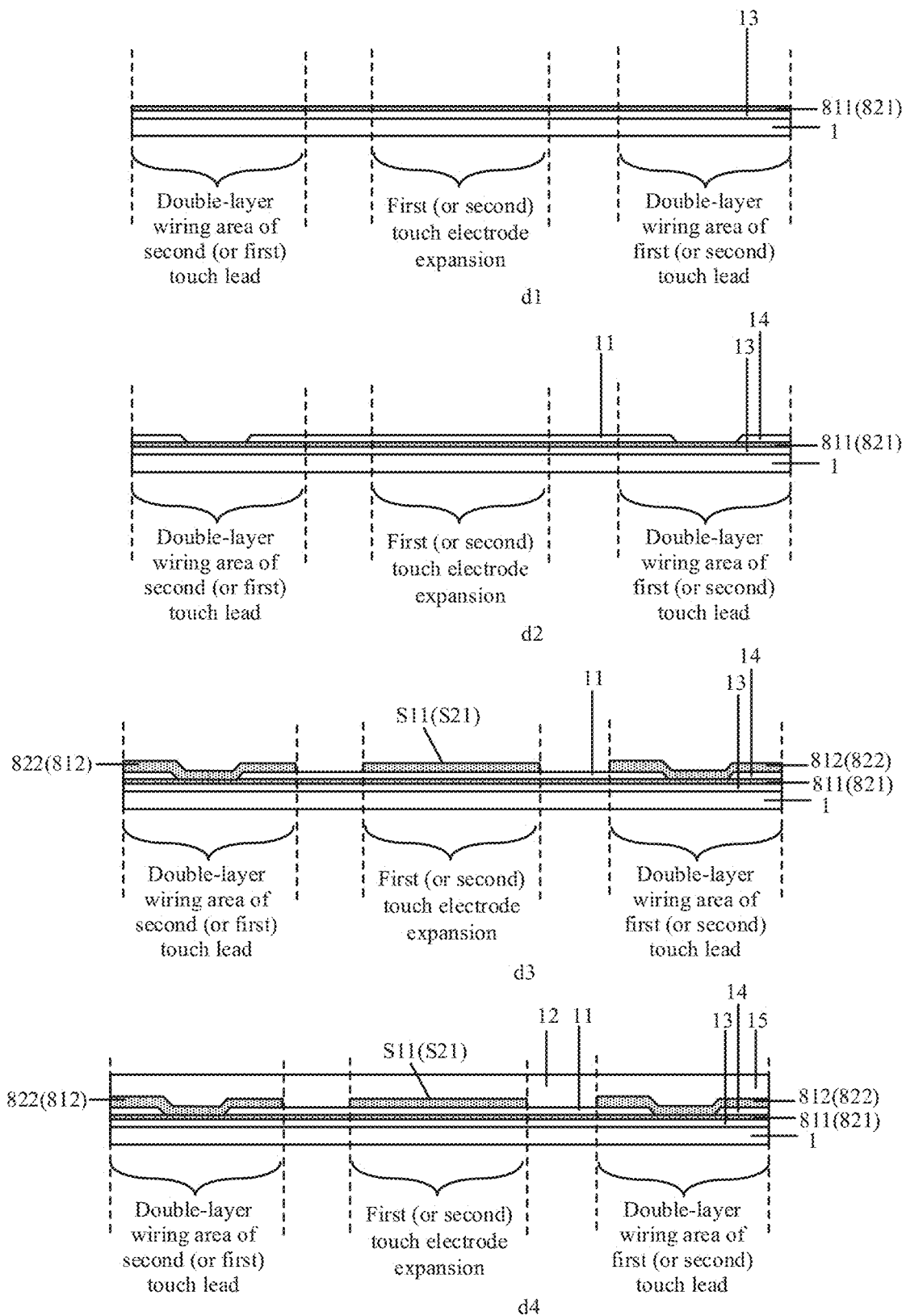
FIG. 16 is a schematic cross-sectional view at the dotted circle in FIG. 15.

In a possible implementation, in combination with FIG. 13, FIG. 14, FIG. 15 and FIG. 16, FIG. 13 is an enlarged schematic diagram of the upper right corner position T2 in FIG. 6, FIG. 15 is an enlarged schematic diagram of the lower right corner position T3 in FIG. 6, FIG. 14 is a schematic cross-sectional view at the dotted circle E4 in FIG. 13, and FIG. 16 is a schematic cross-sectional view at the dotted circle E5 in FIG. 15. The upper and lower diagrams on the right side of FIG. 13 are enlarged schematic diagrams of the lower left diagram of FIG. 13 at the positions E41, E42, and the upper diagram on the left side of FIG. 13 mainly shows the second touch electrode extension part S21 extending from the second touch electrode S2 closest to the touch area A1, where, the enlarged diagram at the position E41 shows that the first touch lead 81 is connected by double-layer punching at the position E43, and the enlarged diagram at the position E42 shows that the first touch lead 81 is connected by double-layer punching at the position E42. The upper diagram on the left side of FIG. 15 mainly shows the second touch electrode extension part S21 extending from the second touch electrode S2 closest to the touch area A1, herein, the enlarged diagram at the position E51 shows that the first touch lead 81 is connected by double-layer punching at the position E53, and the enlarged diagram at the position E52 shows that the first touch lead 81 is connected by double-layer punching at the position E52. At the corner position having only the first touch lead 81 (i.e., the upper right corner position T2 or the lower right corner position T3 in FIG. 1A), the display substrate in the lead area A2 further includes a second touch electrode extension part S21 extending from the second touch electrode S2 closest to the touch region A1; and the display substrate includes the first compensation capacitor C1 formed by the second touch electrode extension part S21 and the first touch lead 81. In this way, it realizes compensation of the mutual capacitance value for the upper right corner position T2 or the lower right corner position T3, and improves the problem that the mutual capacitance value of the display substrate at the upper right corner position T2 or the lower right corner position T3 is too small, which is prone to the phenomenon of weak anti-noise ability of the touch unit (sensor), and the amount of noises is large.

Specifically, in combination with FIG. 13, FIG. 14, FIG. 15 and FIG. 16, the second touch electrode extension part S21 is on the same layer as the second sub-touch lead 812; and at the corner position having only the first touch lead 81 (that is, the upper right corner position T2 or the lower right corner position T3), the orthographic projection of the second touch electrode extension part S21 on the base substrate 1 is partially overlapped with the orthographic projection of the first sub-touch lead 811 on the base substrate 1, to form the first compensation capacitor C1. Specifically, as shown in FIG. 13, the second touch electrode extension part S21 may be disposed at the position Finger2 or Finger3.

Figure 17:
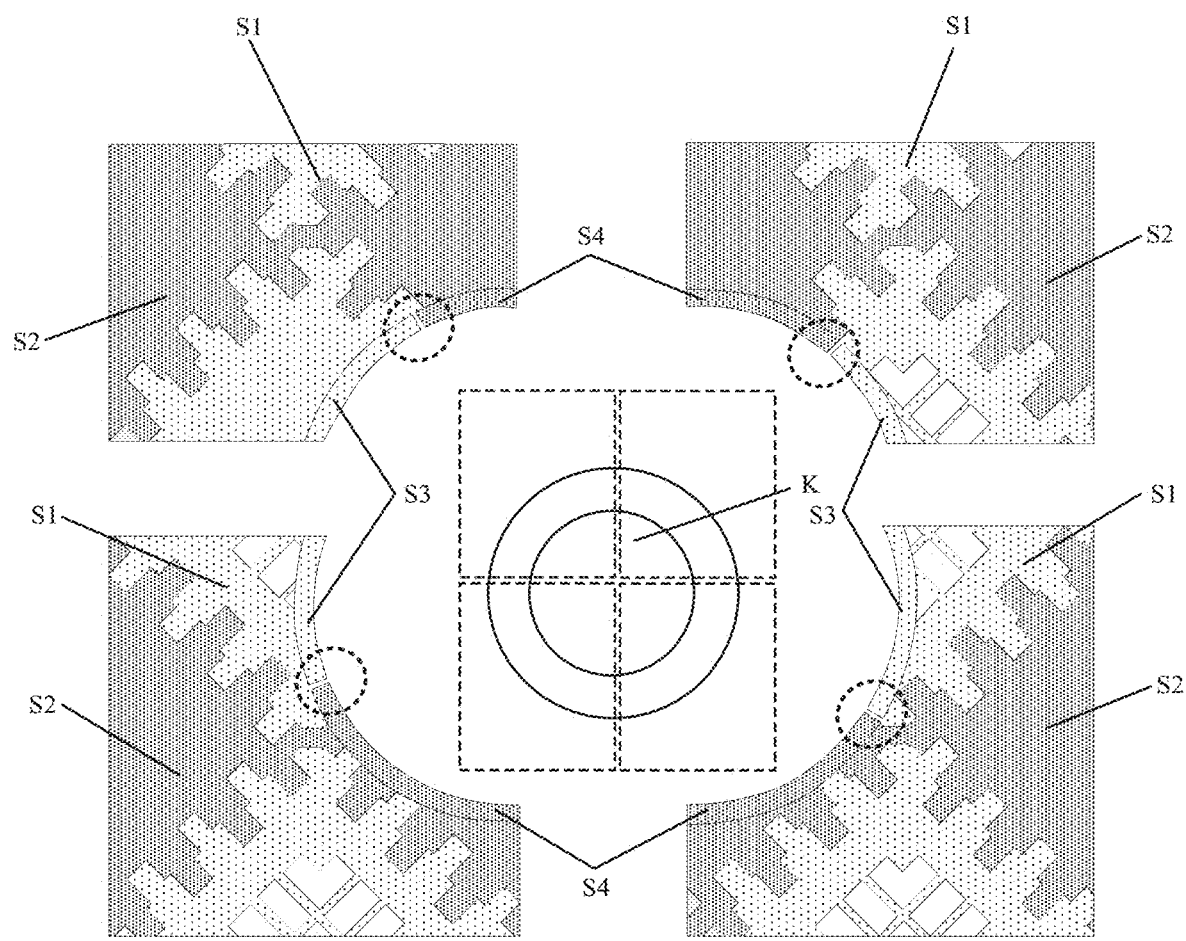
FIG. 17 is an enlarged schematic diagram of a through hole K at the upper left corner position.
Figure 18:
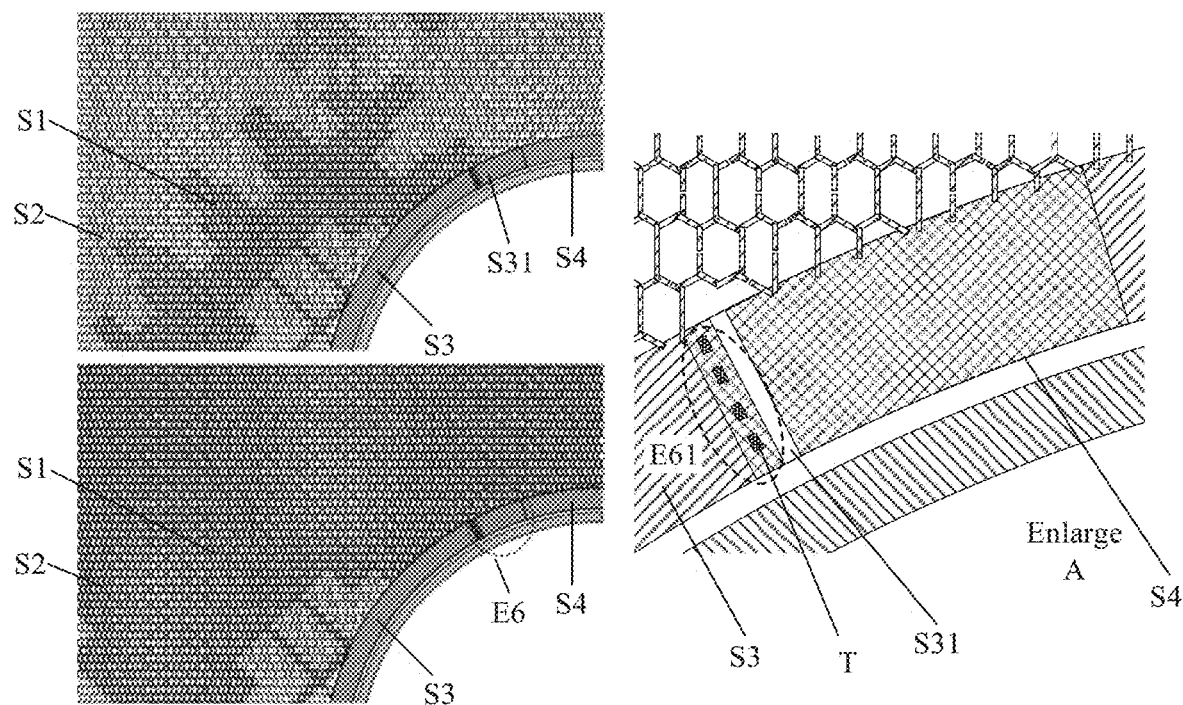
FIG. 18 is an enlarged schematic diagram of the dotted circle in FIG. 17.
Figure 19:
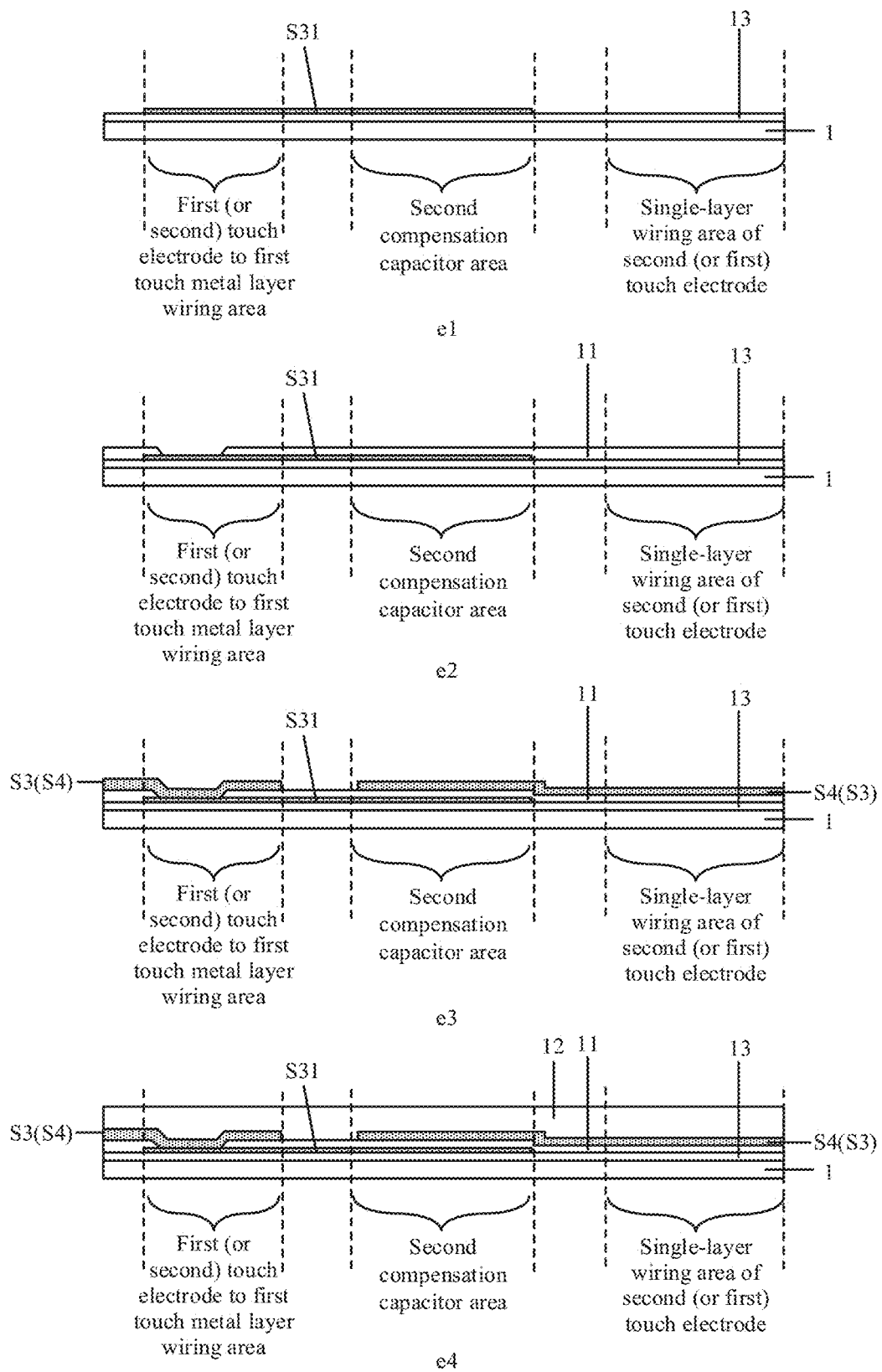
FIG. 19 is a schematic cross-sectional view at the dotted circle E6 in FIG. 18.

In a possible implementation, as shown in FIG. 17, FIG. 18, and FIG. 19, FIG. 17 is an enlarged schematic diagram of a through hole, FIG. 18 is an enlarged schematic diagram of one of the dotted circles in FIG. 17 (such as the dotted circle at the upper left corner), the upper diagram on the left side of FIG. 18 mainly shows the first epitaxial part S31 connected to the end perforation of the first compensation part S3 (such as the via hole T in FIG. 18), the diagram on the right side of FIG. 18 is an enlarged schematic diagram of the dotted circle E6 on the lower left side of FIG. 18, and FIG. 19 is a schematic cross-sectional view of the dotted circle E6 in FIG. 18. The display substrate further includes a through hole K in the display area A; the display substrate includes a first compensation part S3 located at a side of the first touch electrode S1 facing the through hole K; and the display substrate further includes a second compensation part S4 located at a side of the second touch electrode S2 facing the through hole K, where the first compensation part S3 is connected to the first touch electrode S1 and surrounds the through hole K, and the second compensation part S4 is connected to the second touch electrode S2 and surrounds the through hole K; the first compensation part S3 and the second compensation part S4 are insulated from each other; and the display substrate includes a second compensation capacitance C2 formed by the first compensation part S3 and the second compensation part S4 at a position of the through hole K. In this way, it realizes compensation of the mutual capacitance value at the peripheral position of the through hole K, and improves the problem that the mutual capacitance value of the display substrate at the peripheral position of the through hole K is too small, which is prone to the phenomenon of weak anti-noise ability of the touch unit (sensor), and the amount of noises is large.

Specifically, in combination with FIG. 17, FIG. 18, and FIG. 19, the display substrate includes the first epitaxial part S31 located on a different layer from the first compensation part S3 and connected to the end perforation of the first compensation part S3 (such as the via hole T in FIG. 19); and an orthographic projection of the first epitaxial part S31 on the base substrate 1 and an orthographic projection of the second compensation part S4 on the base substrate 1 have an overlapping area, to form the second compensation capacitor C2.

Specifically, the display substrate may include two arc-shaped first compensation parts S3 located on the left and right sides of the through hole K, as shown in FIG. 17, arc segments on the upper left side and the lower left side of the through hole K are integrally connected to form one arc-shaped first compensation part S3, and arc segments on the upper right side and the lower right side of the through hole K are integrally connected to form another arc-shaped first compensation part S3. The display substrate may include two arc-shaped second compensation parts S4 located on the upper and lower sides of the through-hole K, as shown in FIG. 17, arc segments on the upper left side and the upper right side of the through hole K are integrally connected to form one arc-shaped second compensation part S4, and arc segments on the lower left side and the lower right side of the through hole K are integrally connected to form another arc-shaped second compensation part S4. Herein, the first compensation part S3 and the second compensation part S4 are located on the same layer, both located on the second touch metal layer, and disconnected from each other at the circular dotted circle.

Specifically, in order to more clearly understand the film layer structure of the display substrate according to the embodiments of the present disclosure, the fabrication of the display substrate according to embodiments of the present disclosure is described below in conjunction with FIG. 3, FIG. 4H, FIG. 9, FIG. 12, FIG. 14, FIG. 16 and FIG. 19.

1. After the encapsulation process, a barrier layer 13 is first deposited, where the material may be SiNx; specifically, before forming the encapsulation layer, the data lines 15 (SD layer) and the passivation layer 14 may also be sequentially formed on the base substrate 1. Of course, during the fabrication process of the display substrate, other signal line layers can also be formed, which is not limited in the embodiments of the present disclosure.

2. The first touch metal layer (TMA) pattern is formed by photolithography (photo mask) process. The material may be a metal structure of Ti—Al—Ti, which is used for forming the sub-layer patterns of the lower channel (bridge part) in the bridge area and the touch wire, the first floating wire, the second floating wire and the third floating wire in the extension area C, and the sub-layer pattern of the touch lead in the lead area A2 on the first touch metal layer.

3. The interlayer dielectric layer 11 (TLD) pattern is formed by photolithography (photo mask) process, where the material may be SiNx, which plays an insulating role. Through the design of the via hole, the upper second touch metal layer (TMB metal layer) which is subsequently formed and the TMA metal in the lower layer may be connected.

4. The second touch metal layer (TMB) pattern is formed by the photolithography (photo mask) process. The material may be a metal structure of Ti—Al—Ti, which is used for forming the sub-layer patterns of the upper channel in the bridge area, the metal mesh (for forming the first touch electrode S1 and the second touch electrode S2) outside the bridge area, and the peripheral signal trace lines (including the touch wire, the first floating wire, the second floating wire, and the third floating wire in the extension area C), and the sub-layer pattern of the touch lead in the lead area A2 on the first touch metal layer. The peripheral signal trace line is a double-layer metal structure of TMA/TMB, and TMA and TMB are connected through the via hole of the TLD.

5. The protective layer 12 (TOC) pattern is formed by a photolithography (photo mask) process. The material may be polyimide (PI), which serves as an insulation protection and covers the metal mesh and the peripheral trace lines.

Specifically, the on cell structure includes two parts: a touch unit (sensor) and a peripheral trace lines. The trace lines connect the signal ports of the touch IC to the sensor to complete signal transmission. Trace lines are usually located above the VSS signal line. Specifically, below the bending area B (that is, the extension area C), the trace lines are located on the VSS line formed by the SD layer; and above the bending area, the trace lines are located on the VSS line formed by the SD layer or above the anode metal layer connected to the SD or above the cathode connected to the above-mentioned anode metal layer. The constant voltage signal of the VSS is used for shielding the BP display signals, to prevent the touch signal from interacting with the BP signals (GOA signal and Data signal). On the film layer structure below the bending area, the GOA signal line and the Data signal line are usually formed by Gate1 and Gate2 layers, the VSS signal line is formed by the SD layer, and the FMLOC trace line is located directly above the VSS signal line and is formed by the double-layer metals of TMA and TMB, where the double-layer metals are connected together through the via hole of the TLD.

Based on the same inventive concept, embodiments of the present disclosure further provide a display apparatus, which includes the display substrate according to the embodiments of the present disclosure.

In the embodiments of the present disclosure, the first floating wiring group 3 is located on at least one side of the touch wiring group 2, and the first floating wiring group 3 includes at least one first floating wire 30. In this way, a plurality of first floating wires 30 are arranged in the periphery of the touch wiring group 2, which can avoid the following problem: if the first floating wiring group 3 is not provided, when patterning to form the touch wires 20, a large amount of etching solutions accumulate in the periphery, which is likely to cause over-etching of the touch wires 20 in the periphery, resulting in uneven line widths of the touch wires 20 in the periphery and the touch wires 20 in the interior, to affect the touch performance. In the embodiments of the present disclosure, a plurality of first floating wires 30 are arranged in the periphery of the touch wires 20; and when there is a large amount of etching solutions in the periphery, the first floating wires 30 in the periphery can be over-etched, thereby protecting the touch wires 20 in the interior, and improving the problem of uniform line widths of touch wires 20 and affecting the touch performance.

Obviously, those skilled in the art can make various modifications and variations to the present disclosure without departing from the spirit and scope of the present disclosure. Thus, if these modifications and variations of the present disclosure fall within the scope of the claims of the present disclosure and their equivalent technologies, the present disclosure is also intended to include these modifications and variations.

What is claimed is:

1. A display substrate, comprising:
   a base substrate; wherein the base substrate comprises: a display area, a bending area connected to a side of the display area, and an extension area connected to a side of the bending area away from the display area;
   a touch wiring group arranged in the extension area; wherein the touch wiring group comprises a plurality of touch wires extending along a first direction and arranged in sequence along a second direction; and
   at least one first floating wiring group on at least one side of the touch wiring group; wherein the at least one first floating wiring group comprises at least one first floating wire extending along the first direction;
   wherein the first direction is a direction pointing from the display area to the bending area and the extension area, and the at least one first floating wire is electrically insulated from the touch wires.

2. The display substrate according to claim 1, wherein the first floating wiring groups are arranged at two sides of the touch wiring group, and different first floating wiring groups have a same number of first floating wires.

3. The display substrate according to claim 1, wherein the display substrate comprises a first power supply line in the extension area;
   wherein an orthographic projection of the first floating wire on the base substrate is at least partially within an orthographic projection of the first power supply line on the base substrate.

4. The display substrate according to claim 3, wherein each of the first floating wires comprises a first sub-floating wire and a second sub-floating wire which are stacked; and
   an orthographic projection of the first sub-floating wire on the base substrate is at least partially coincident with an orthographic projection of the second sub-floating wire on the base substrate.

5. The display substrate according to claim 4, wherein each of the touch wires comprises a first sub-touch wire and a second sub-touch wire which are stacked; and
   the first sub-floating wire and the first sub-touch wire are on a same layer and have a same material, and the second sub-floating wire and the second sub-touch wire are on a same layer and have a same material.

6. The display substrate according to claim 1, wherein the bending area comprises a first edge close to the display area, a second edge opposite to the first edge and close to the extension area, and a connection edge that connects the first edge with the second edge;
   wherein the display substrate comprises signal traveling lines in the bending area, and a region between the signal traveling lines and the connection edge has a second floating wiring group surrounding the connection edge; and
   the second floating wiring group comprises at least one second floating wire, and the second floating wire is electrically insulated from the signal traveling lines.

7. The display substrate according to claim 6, wherein the second floating wire comprises a third sub-floating wire and a fourth sub-floating wire which are stacked; and an orthographic projection of the third sub-floating wire on the base substrate is at least partially coincident with an orthographic projection of the fourth sub-floating wire on the base substrate.

8. The display substrate according to claim 6, wherein the display substrate further comprises a third floating wiring group on a side of the second floating wiring group away from the connection edge; and
the third floating wiring group comprises at least one third floating wire extending along the second direction.

9. The display substrate according to claim 8, wherein the third floating wire comprises a fifth sub-floating wire and a sixth sub-floating wire which are stacked; and
an orthographic projection of the fifth sub-floating wire on the base substrate is at least partially coincident with an orthographic projection of the sixth sub-floating wire on the base substrate.

10. The display substrate according to claim 9, wherein, in a direction perpendicular to the second edge, a minimum distance between the third floating wiring group and the signal traveling lines is smaller than a distance between the third floating wiring group and the second edge.

11. The display substrate according to claim 1, wherein the display area comprises a touch area having touch electrodes, and a lead area surrounding the touch area and having touch leads; and
the lead area comprises a first compensation capacitor electrically connected to the touch leads at at least one corner position.

12. The display substrate according to claim 10, wherein the touch electrodes comprise a plurality of first touch electrodes extending along the first direction, and a plurality of second touch electrodes extending along the second direction and electrically insulated from the first touch electrodes;
the touch leads comprise first touch leads that are electrically connected to the first touch electrodes in one-to-one correspondence, and second touch leads that are electrically connected to the second touch electrodes in one-to-one correspondence;
the first touch leads and the second touch leads each has double-layer sub-leads; and
at a corner position having the first touch lead and the second touch lead, the display substrate comprises the first compensation capacitor formed by mutual extension of different layers of sub-leads of the first touch lead and the second touch lead.

13. The display substrate according to claim 12, wherein each of the first touch leads comprises a first sub-touch lead and a second sub-touch lead which are stacked, and each of the second touch leads comprises a third sub-touch lead and a fourth sub-touch lead which are stacked;
the first sub-touch lead and the third sub-touch lead are on a same layer and have a same material, and the second sub-touch lead and the fourth sub-touch lead are on a same layer and have a same material;
at the corner position having the first touch lead and the second touch lead, the first touch lead closest to the touch area has a first lead extension part extending from the first sub-touch lead, the second touch lead closest to the touch area has a fourth lead extension part extending along the fourth sub-touch lead, and an orthographic projection of the first lead extension part on the base substrate overlaps with an orthographic projection of the fourth lead extension part on the base substrate, to form the first compensation capacitor; or, at the corner position having the first touch lead and the second touch lead, the first touch lead closest to the touch area has a second lead extension part extending from the second sub-touch lead, the second touch lead closest to the touch area has a third lead extension part extending along the third sub-touch lead, and an orthographic projection the second lead extension part on the base substrate overlaps with an orthographic projection of the third lead extension part on the base substrate, to form the first compensation capacitor.

14. The display substrate according to claim 13, wherein, at a corner position having only the second touch lead, the display substrate in the lead area further comprises a first touch electrode extension part extending from the first touch electrode closest to the touch area; and
the display substrate comprises the first compensation capacitor formed by the first touch electrode extension part and the second touch lead.

15. The display substrate according to claim 14, wherein the first touch electrode extension part is on a same layer as the fourth sub-touch lead; and
at a corner position having only the second touch lead, an orthographic projection of the first touch electrode extension part on the base substrate is partially overlapped with an orthographic projection of the third sub-touch lead on the base substrate to form the first compensation capacitor.

16. The display substrate according to claim 13, wherein, at a corner position having only the first touch lead, the display substrate in the lead area further comprises a second touch electrode extension part extending from the second touch electrode closest to the touch area; and
the display substrate comprises the first compensation capacitor formed by the second touch electrode extension part and the first touch lead.

17. The display substrate according to claim 16, wherein the second touch electrode extension part is on a same layer as the second sub-touch lead; and
at the corner position having only the first touch lead, an orthographic projection of the second touch electrode extension part on the base substrate is partially overlapped with an orthographic projection of the first sub-touch lead on the base substrate to form the first compensation capacitor.

18. The display substrate according to claim 12, wherein the display substrate further comprises a through hole in the display area;
wherein the display substrate comprises:
a first compensation part at a side of the first touch electrode facing the through hole, wherein the first compensation part is connected to the first touch electrode and surrounds the through hole, and
a second compensation part at a side of the second touch electrode facing the through hole, wherein the second compensation part is connected to the second touch electrode and surrounds the through hole;
wherein the first compensation part and the second compensation part are insulated from each other; and
the display substrate comprises a second compensation capacitance formed by the first compensation part and the second compensation part at a position of the through hole.

19. The display substrate according to claim 18, wherein the display substrate comprises a first epitaxial part located on a different layer from the first compensation part and connected to an end perforation of the first compensation part; and an orthographic projection of the first epitaxial part on the base substrate and an orthographic projection of the second compensation part on the base substrate have an overlapping area, to form the second compensation capacitor.

20. A display apparatus, comprising a display substrate, wherein the display substrate comprises:
- a base substrate; wherein the base substrate comprises: a display area, a bending area connected to a side of the display area, and an extension area connected to a side of the bending area away from the display area;
- a touch wiring group arranged in the extension area; wherein the touch wiring group comprises a plurality of touch wires extending along a first direction and arranged in sequence along a second direction; and
- at least one first floating wiring group on at least one side of the touch wiring group; wherein the at least one first floating wiring group comprises at least one first floating wire extending along the first direction;
- wherein the first direction is a direction pointing from the display area to the bending area and the extension area, and the at least one first floating wire is electrically insulated from the touch wires.

* * * * *